May 27, 1969     H. H. PRYOR ET AL     3,446,137
HOT BEVERAGE MERCHANDIZER

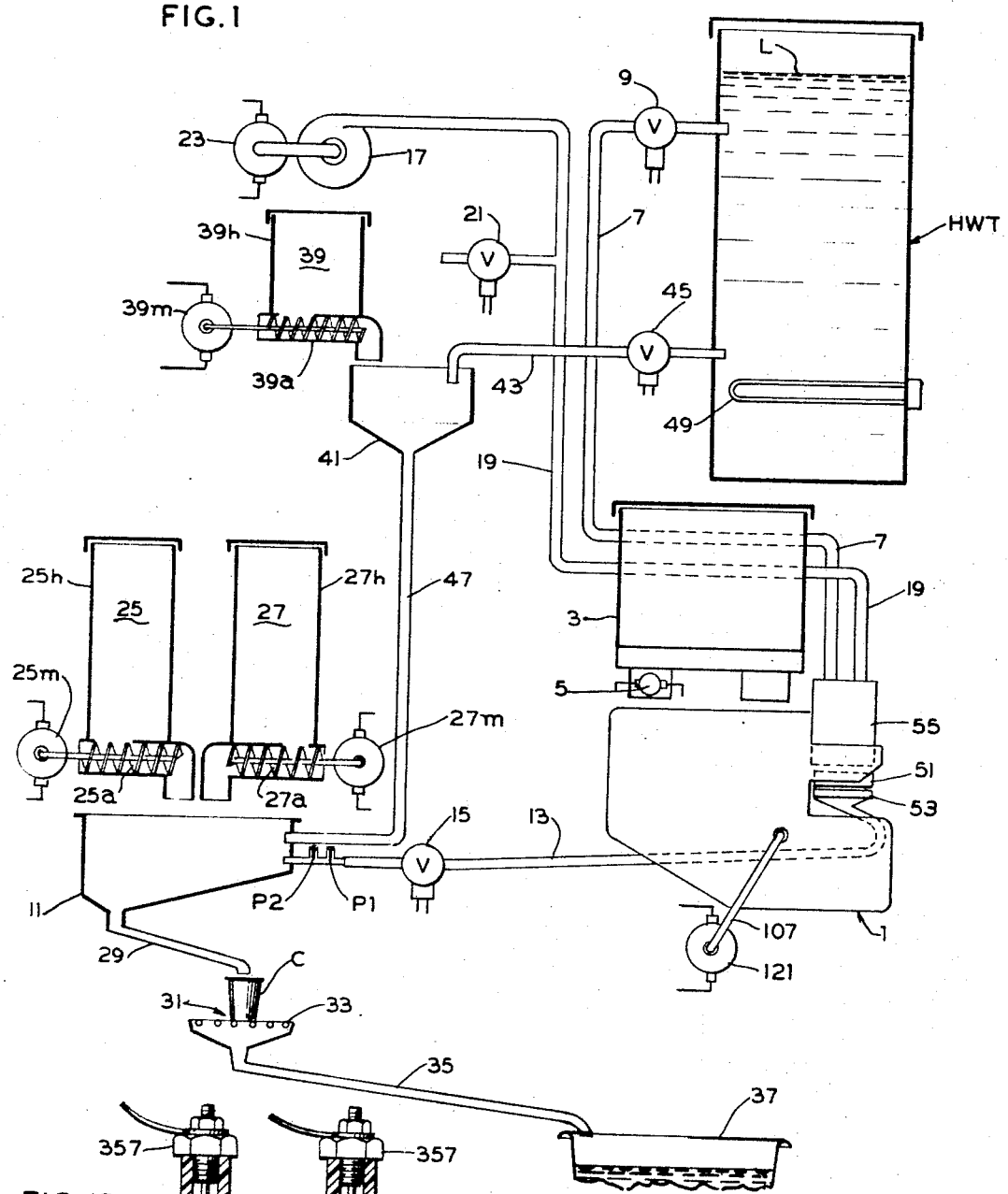
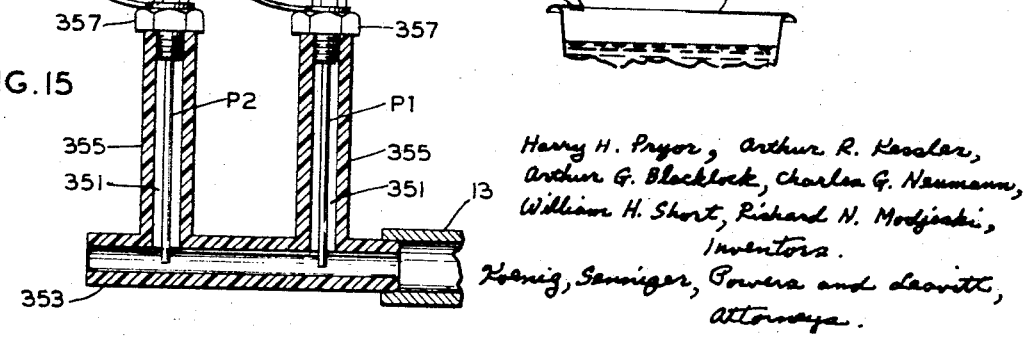

Filed Feb. 13, 1967

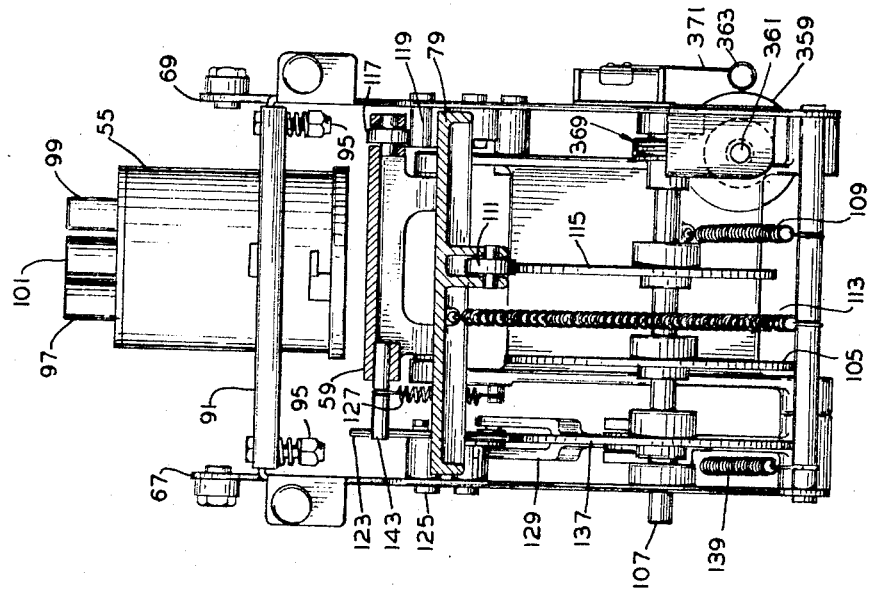

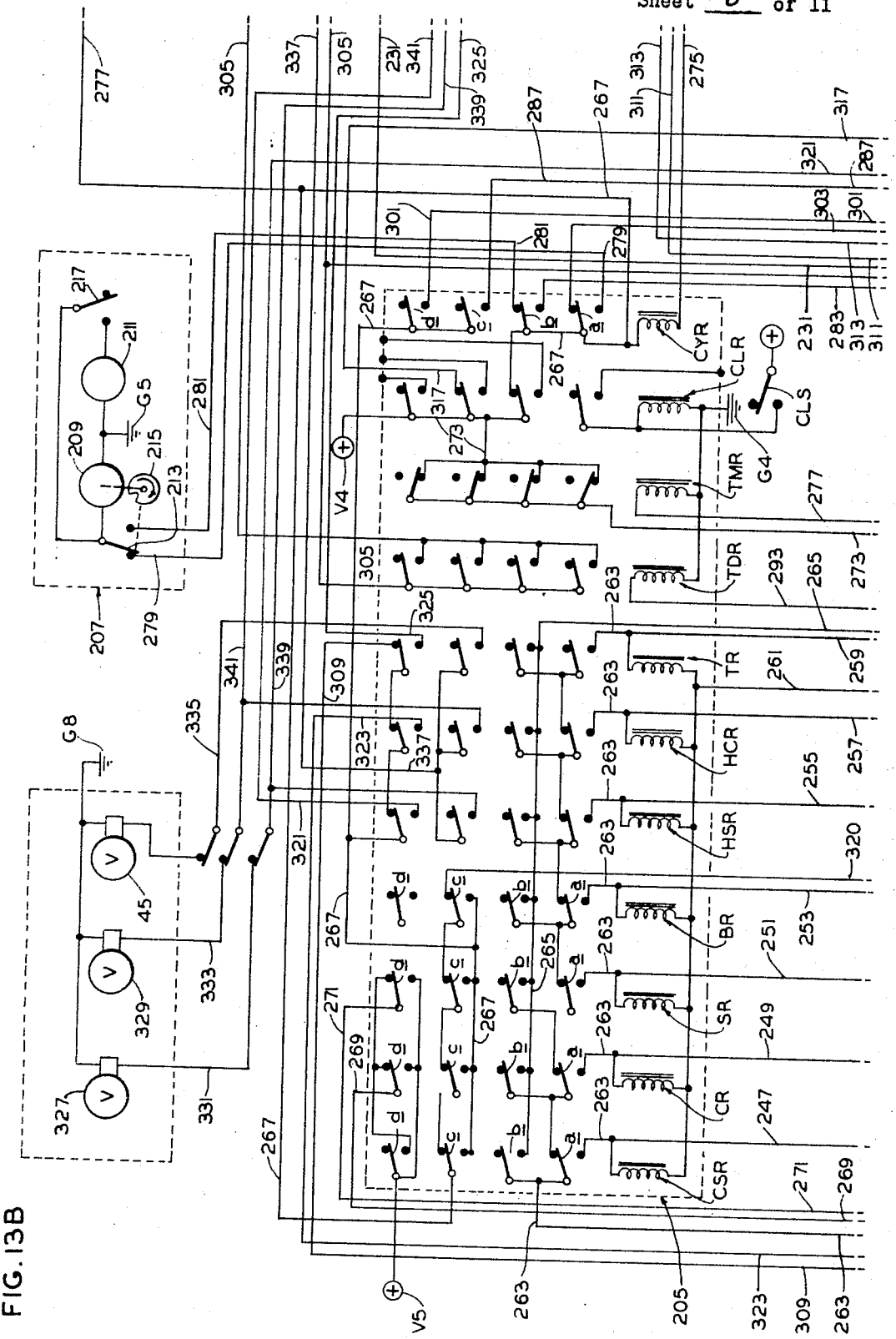

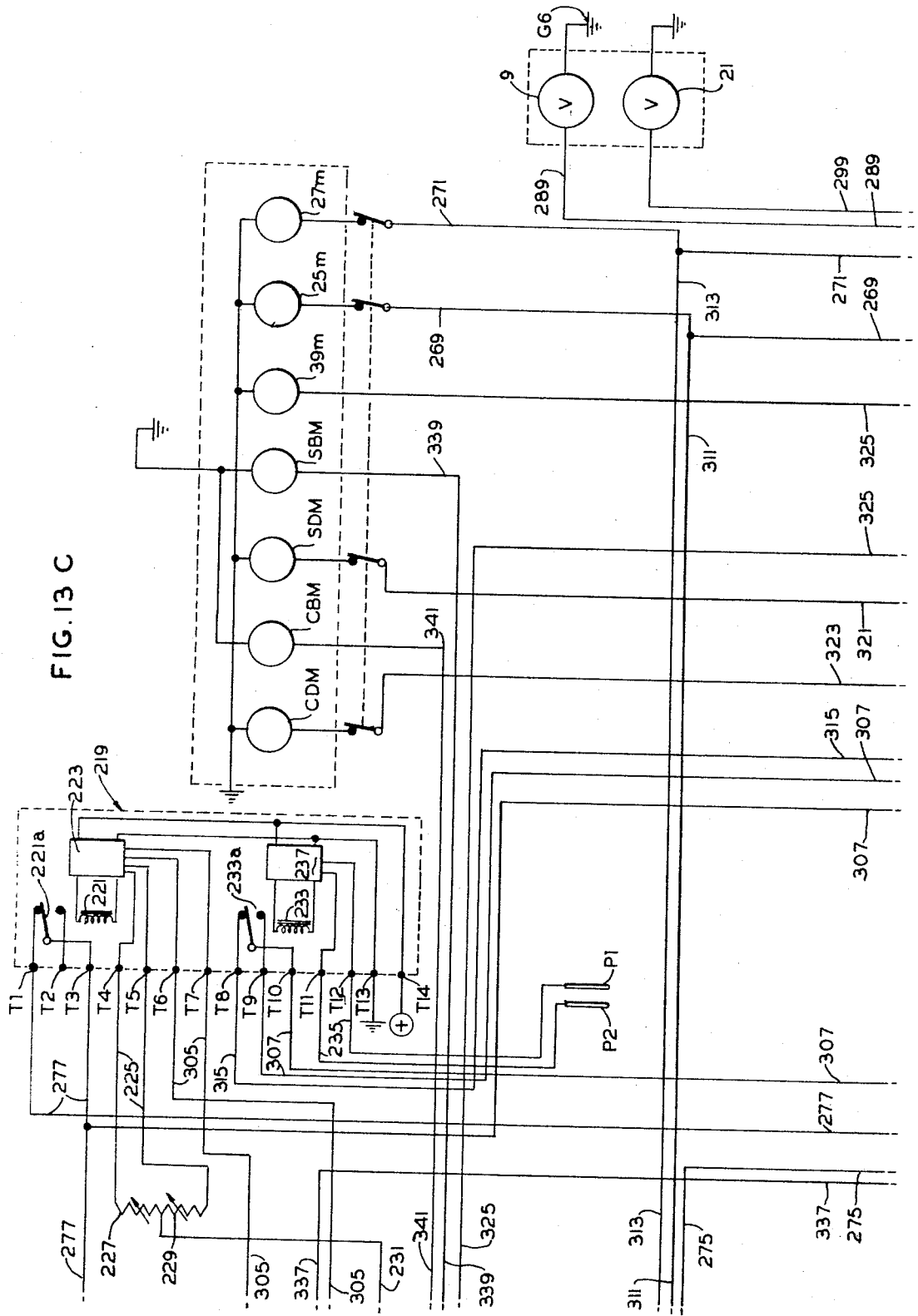

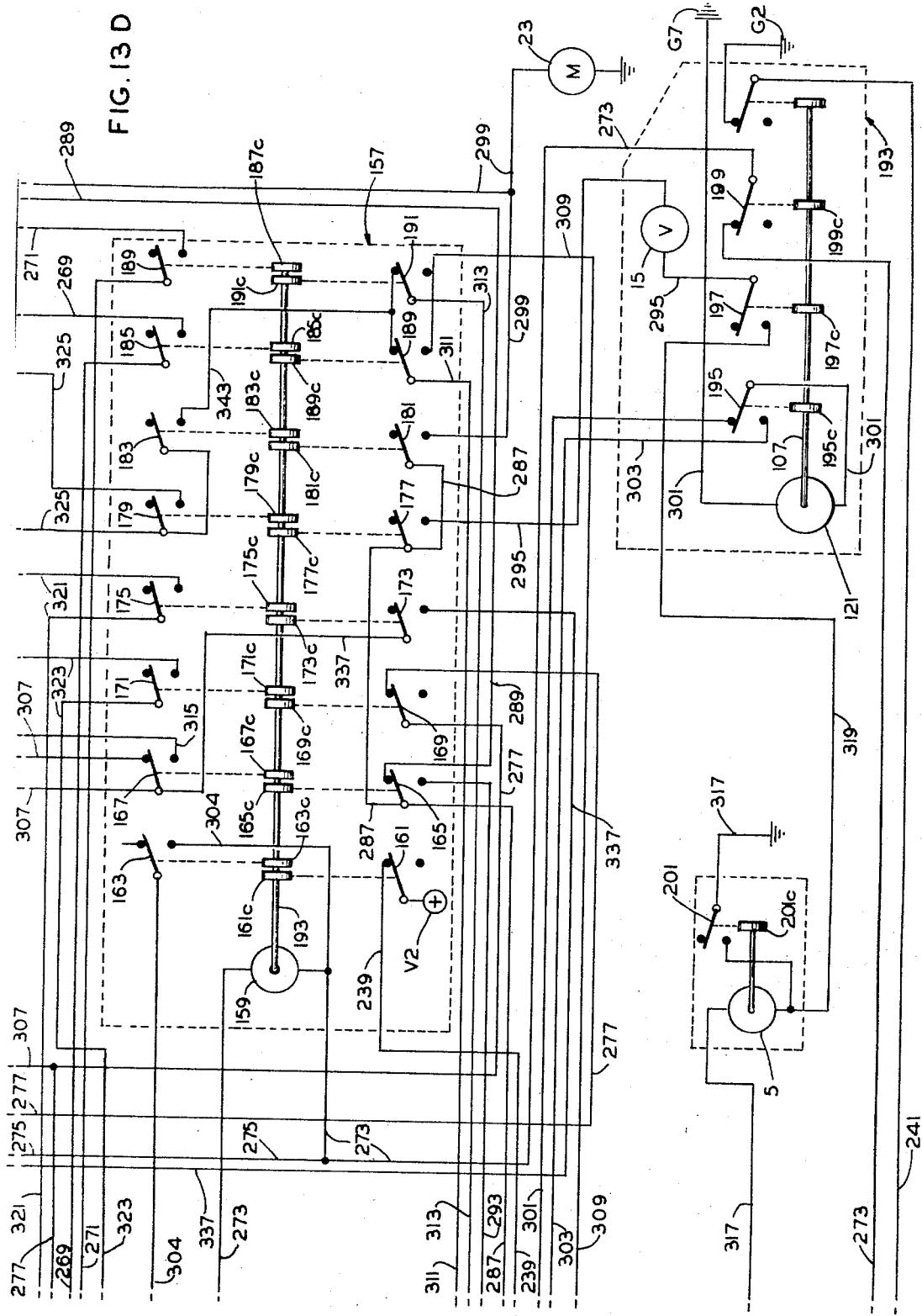

United States Patent Office 3,446,137
Patented May 27, 1969

3,446,137
HOT BEVERAGE MERCHANDIZER
Harry H. Pryor, St. Louis, Arthur R. Kessler, Florissant, and Arthur G. Blacklock, Jennings, Mo., Charles G. Neumann, Palatine, Ill., William H. Short, St. Ann, Mo., and Richard N. Modjeski, Evergreen Park, Ill., assignors to UMC Industries, Inc., St. Louis, Mo., a corporation of Delaware
Filed Feb. 13, 1967, Ser. No. 615,413
Int. Cl. A23f 3/00, 1/12
U.S. Cl. 99—289                           34 Claims

ABSTRACT OF THE DISCLOSURE

A hot beverage merchandiser for brewing and vending coffee and other hot beverages in single-cup quantities, which includes a main system for brewing coffee from ground coffee, an auxiliary system for brewing tea or decaffeinated coffee from instant tea or instant decaffeinated coffee, and a system for adding cream and/or sugar to the coffee or the tea, according to the purchaser's selection.

Background of the invention

The invention is in the field of hot beverage vendors, i.e., coin-controlled apparatus for vending hot beverages, and particularly such vendors for vending hot coffee brewed from ground coffee. As herein disclosed, the invention involves such a vendor for brewing coffee in single-cup quantities from ground coffee, a so-called single-cup fresh brew vendor.

Examples of single-cup fresh brew coffee vendors which are presently on the market may be found in U.S. Patents 3,125,945 and 3,221,637. These operate essentially by forcing hot water through a closely confined charge of ground coffee and thence through filter tape. A problem existent in brewing systems of this class is that of obtaining maximum extraction of solubles in the ground coffee and filtering out fines, for vending of better coffee using a minimum of ground coffee. Such vendors also generally include an auxiliary system for adding cream and/or sugar (the cream being a powder product) to the brewed coffee, and a problem existent in the use of such an auxiliary system has been that of ensuring that the cream and/or sugar is dispensed into the brewed coffee flowing through a mixing bowl to the customer's cup, rather than being dispensed into a dry bowl (in advance of flow of the coffee), to avoid caking of the cream and sugar in the bowl.

Summary of the invention

The invention involves the provision of a brew system comprising an inverted brew vessel for receiving a measured quantity of hot water for brewing a corresponding quantity of coffee. In the case of a single-cup vendor as herein disclosed, this would be a cup of hot water. It is contemplated, however, that the principles of the invention would be applicable to a batch-brew vendor, in which a plural-cup batch of coffee, rather than a single cup, would be brewed on each brew cycle. The system further comprises a cup for holding a charge of ground coffee, this cup being engageable with and disengageable from the bottom of the pressure vessel. Filter means is provided at the bottom of the cup. Means is provided for delivering a charge of ground coffee from a supply thereof to the cup and for delivering the measured quantity of hot water from a supply thereof to the brew vessel when the cup, with the charge of ground coffee therein, is engaged with the bottom of the vessel. Further, means is provided for delivering compressed air to the vessel after the hot water has been delivered to the vessel and following a brew interval for forcing the brewed coffee out of the vessel and cup through the filter means.

Upon delivery of the hot water to the vessel, the particles of ground coffee in the cup rise in the hot water and become soaked with hot water. The soaked particles then settle in the hot water into a bed on the filter means, substantial settlement occuring prior to the delivery of compressed air to force the brewed coffee out of the vessel. This ensures maximum extraction of solubles from the ground coffee and, by reason of passage of the brewed coffee through the bed of soaked particles tends to minimize the amount of fines passing through the filter means.

The invention further involves the provision of a system for adding cream and/or sugar to the brewed coffee, which operates in response to flow of brewed coffee from the brewer of the brew system, rather on a timed basis, to ensure that cream and/or sugar are dispensed into coffee flowing through the mixing bowl, thereby avoiding dispensing cream and/or sugar into a dry mixing bowl. As will appear, this system includes components which, in addition to sensing flow of brewed coffee to the bowl for controlling dispensing of cream and sugar, also sense completion of delivery of the brewed coffee and control the opening up of the brewer to ensure that the brewer does not open until all of the brewed coffee is out of the brewer.

The invention further involves the provision of a system for brewing tea or decaffeinated coffee from instant tea or instant decaffeinated coffee, utilizing the cream and sugar system for adding cream and/or sugar to the brewed tea or decaffeinated coffee, as will appear. Other objects and features will be in part apparent and in part pointed out hereinafter.

Brief description of the drawings

FIG. 1 is a diagram showing the main brew system, the cream and sugar system, and the tea or decaffeinated coffee brewing system of a merchandiser of this invention;

FIG. 11 is a left end view of the brewer, with parts broken away and shown in section;

FIG. 12 is a section on line 12—12 of FIG. 4;

FIGS. 13A–D show the electrical circuitry of the merchandiser, FIG. 13B fitting above FIG. 13A, FIG. 13C fitting to the right of FIG. 13B, and FIG. 13D fitting below FIG. 13C and to the right of FIG. 13A;

FIG. 15 (Sheet 1) is a detail of certain probes.

Corresponding reference characters indicate corresponding parts throughout the several views of the drawings.

Description of the preferred embodiment

Figure 2:
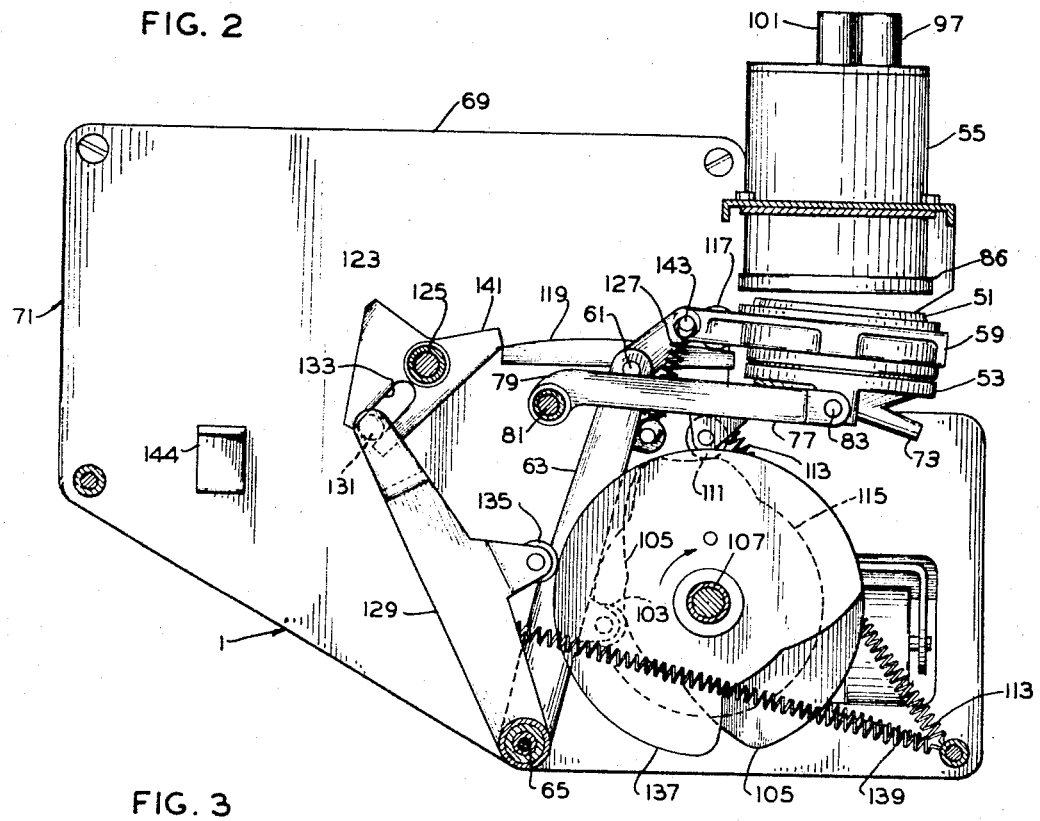
FIG. 2 is a side elevation of the brewer of the main brew system, showing certain parts in their home position.

Referring to the drawings, first more particularly to FIG. 1, a vendor of this invention is shown to comprise a main brew system including a brewer generally designated 1 adapted to receive a charge (a "throw") of ground coffee from a ground coffee dispenser 3 and also to receive a measured quantity of hot water (a cup of hot water as herein illustrated) from a hot water tank HWT for brewing a cup of coffee. Dispenser 3 has an electric motor indicated at 5. The hot water is delivered to the brewer from the tank via a hot water delivery line 7 which has a solenoid valve 9 therein adapted, when energized, to open the line for delivery of water. Brewed coffee is delivered from the brewer to a mixing bowl 11 via a delivery line 13 having a solenoid valve 15 therein adapted to be closed during brewing of coffee in the brewer and to open after brewing has been concluded for flow of the brewed coffee through line 13 to the mixing bowl. An air compressor 17 is provided for delivering compressed air via a line 19 to the brewer to force brewed coffee from the brewer through line 13 to the mixing bowl 11 (valve 15 being opened for this purpose). Line 19 is adapted to be vented to atmosphere to vent the brewer while the latter is being charged with hot water from tank HWT by means of a solenoid valve 21. This is normally open when deenergized, and is energized to close when compressor 17 is in operation so that line 19 and the brewer will then be pressurized. An electric motor for operating the compressor is indicated at 23.

Positioned above the mixing bowl 11 are dispensers 25 and 27 for powdered cream and sugar, respectively. Each of these is indicated in FIG. 1 as of a conventional type having a hopper for the ingredient to be dispensed and a motor-driven auger for dispensing a metered amount of the ingredient from the hopper. As to the cream dispenser 25, the hopper is designated 25h, the auger is designated 25a, and the motor for driving the auger is designated 25m. As to the sugar dispenser 27, the hopper is designated 27h, the auger is designated 27a, and the motor for driving the auger is designated 27m. For dispensing of cream, motor 25m is energized for an interval to auger out a metered amount of cream into the mixing bowl and, for dispensing of sugar, motor 27m is energized for an interval to auger out a metered amount of sugar into the mixing bowl. A line 29 extends from the mixing bowl to a cup station 31 for delivery of the coffee (black, or with cream, or sugar, or with cream and sugar) to a cup C delivered by a conventional cup dispenser (not shown in FIG. 1) to the cup station. The cup, delivered by the cup dispenser, rests on the usual grille 33 drained as indicated at 35 to a waste can 37.

As shown in FIG. 1, the vendor of this invention is also adapted for the vending of hot tea or decaffeinated coffee by being provided with a dispenser 39 for a measured throw of instant tea or instant decaffeinated coffee having its outlet positioned over a mixing bowl 41. A line 43 having a solenoid valve 45 therein extends from the hot water tank HWT to the bowl 41 and a line 47 extends from bowl 41 to bowl 11 for delivery of tea or decaffeinated coffee from bowl 41 to bowl 11 for addition of cream or sugar or cream and sugar to the tea or decaffeinated coffee. Dispenser 39 is shown as of a conventional type having a hopper 39h, an auger 39a and a motor 39m for driving the auger.

The hot water tank HWT is of a conventional type having an electric immersion heater 49 for heating the water therein. It is connected to a tap water source and has suitable conventional means (not shown) for maintaining water therein to a level such as indicated at L. Hot water lines 7 and 43 extend from below level L, and the flow through these lines to brewer 1 and bowl 41 is by gravity under the head of water in the tank above the exits to lines 7 and 43. As will appear, on a brew cycle, valve 9 is opened for an interval of time such as to provide for flow of one cup of hot water to the brewer. On a tea or decaffeinated coffee vend cycle, valve 45 is opened for an interval of time such as to provide for flow of one cup of hot water to the bowl 41.

The brewer 1, which is illustrated in detail in FIGS. 2–12, comprises a cup 51 which holds the charge of ground coffee, a bottom closure or head 53 for the cup, and a brew vessel 55 above the cup. The cup 51 is of shallow cylindrical form, with a filter screen 57 at its bottom. It is secured in an opening at the free end of an arm 59 pivoted by means of a horizontal pin connection 61 at the upper end of a shifter lever 63. The latter is pivoted at its lower end on a shaft 65 extending horizontally between side walls 67 and 69 of a brewer chassis 71. The bottom closure 53 is in the form of a funnel having an inclined bottom outlet 73, and is provided at its rim with a gasket 75 for sealing engagement with the bottom of the cup 51. The bottom head or funnel 53 is adapted for up-and-down movement, being mounted between a pair of arms 77 of a lever 79 pivoted on a shaft 81 extending horizontally between walls 67 and 69. The bottom head or funnel 53 is frictionally pivoted between the arms 77 as indicated at 83. The vessel 55 is in the form of an inverted cylindrical cup, open at the bottom, of such height in relation to its diameter as to be able to hold in conjunction with cup 51 somewhat more than a cup of hot water (and brewed coffee). It has an insert 85 having an outwardly projecting rim 86 at its lower end, carrying a gasket 86a for sealing engagement by the upper end of the cup 51 when the latter is raised by the bottom head 53. The insert may carry a tubular cylindric baffle 87. A screen 88 of larger mesh than screen 57 is provided at the bottom of the insert. Screen 57 may be a 250 mesh screen, and screen 88 an 80 mesh screen, for example. The vessel 55 is secured in an opening 89 in a plate 91 straddling the chassis side walls 67 and 69, this plate (and vessel 55 carried thereby) being biased downward by springs 93 acting on bolts 95 extending downward through holes in inturned upper flanges 67a and 69a on the chassis side walls. The vessel 55 has a check-valved hot water inlet 97 at the top to which is connected the hot water delivery line 7. It also has a port 99 at the top to which is connected the air line 19 from the compressor 17. It may also have a check-valved hot water inlet 101 at the top for connection of a hot water line of a cleaning and sanitizing system (not shown herein). These lines are made flexible to accommodate the slight yielding movements of the vessel 55.

Figure 4:
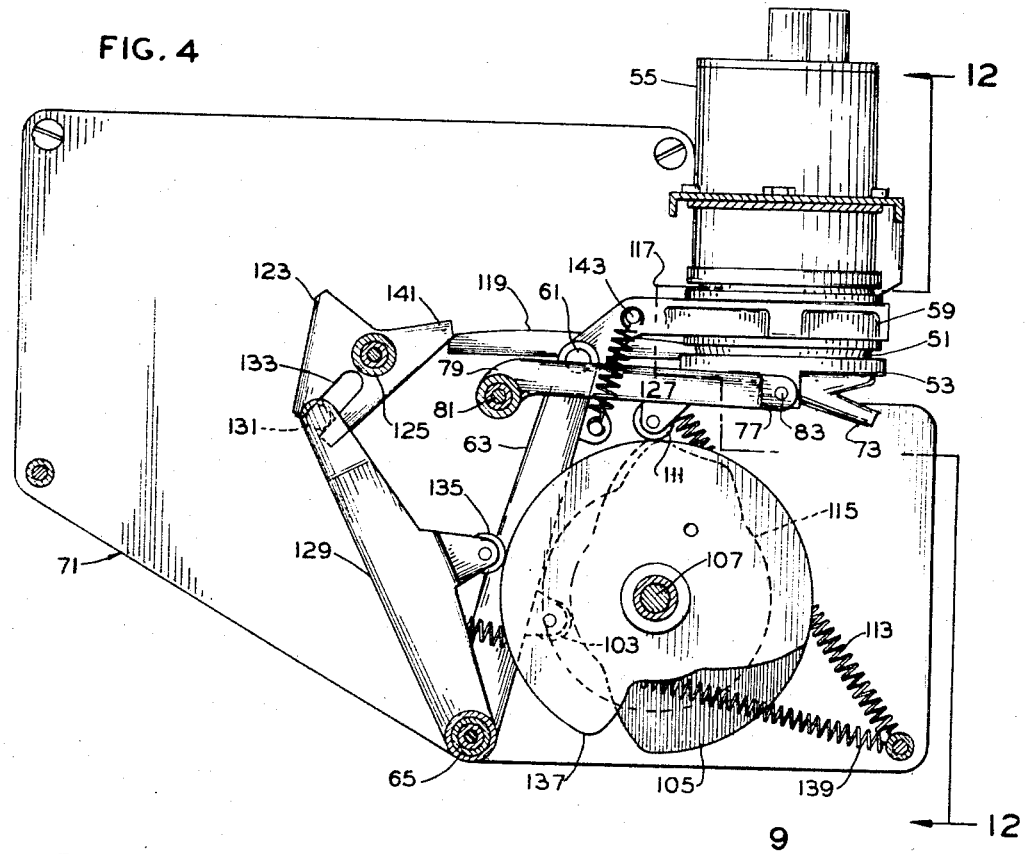
FIG. 4 is a longitudinal section on line 4—4 of FIG. 5, showing certain parts in a closed position occupied for brewing.
Figure 5:
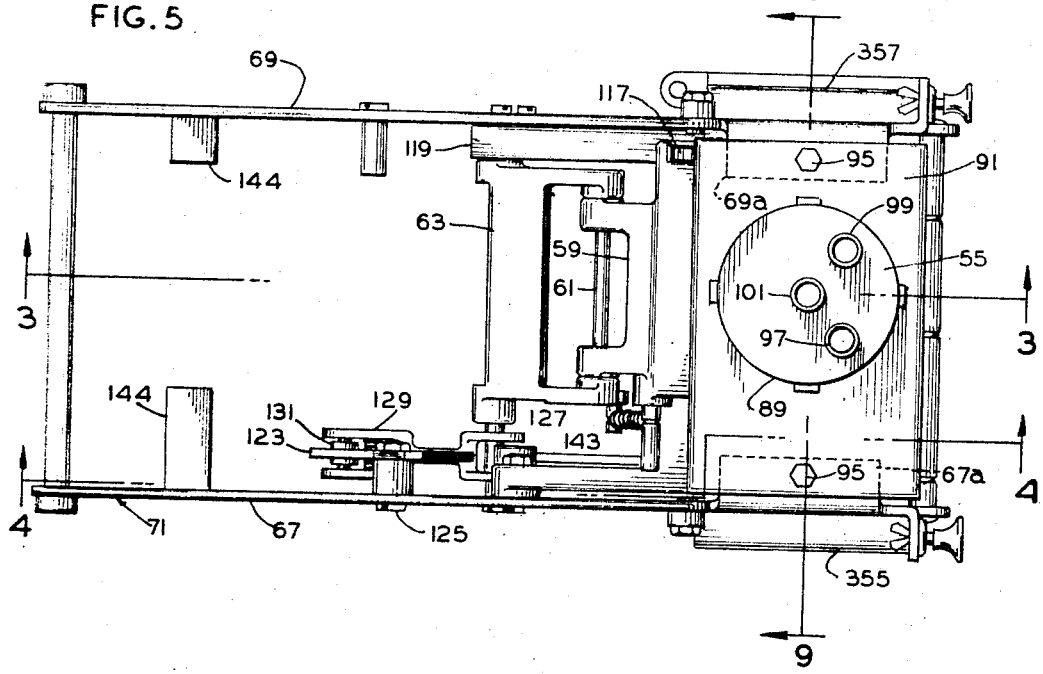
FIG. 5 is a plan of the FIG. 2 brewer.
Figure 6:
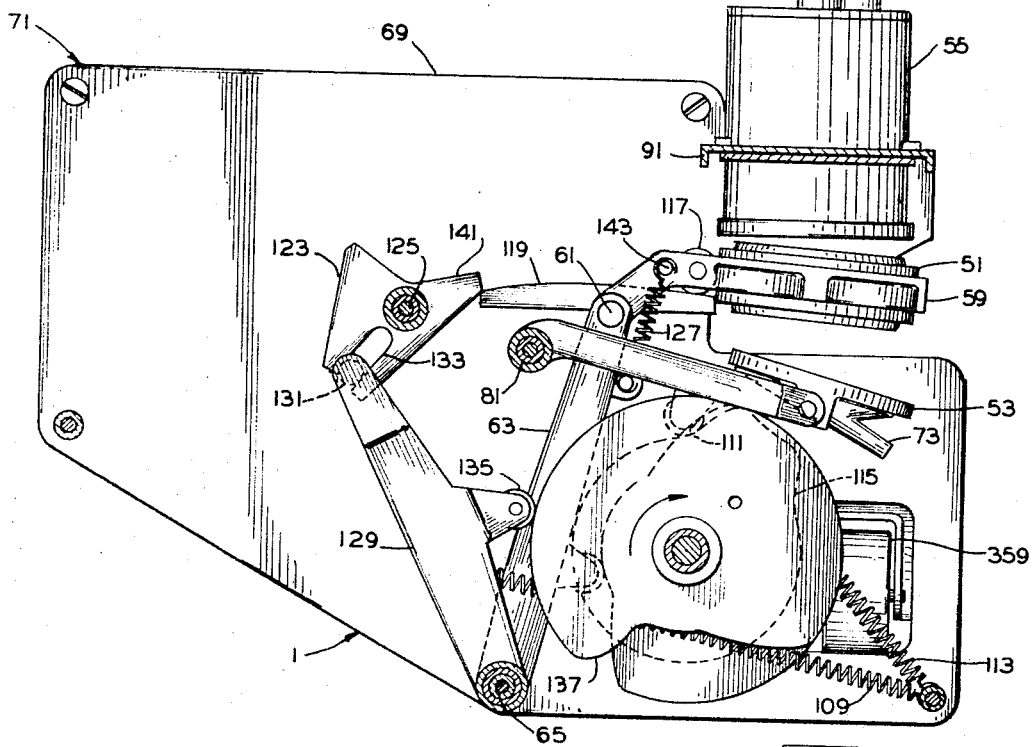
FIG. 6 is a view similar to FIG. 4 showing a moved position of parts.
Figure 9:
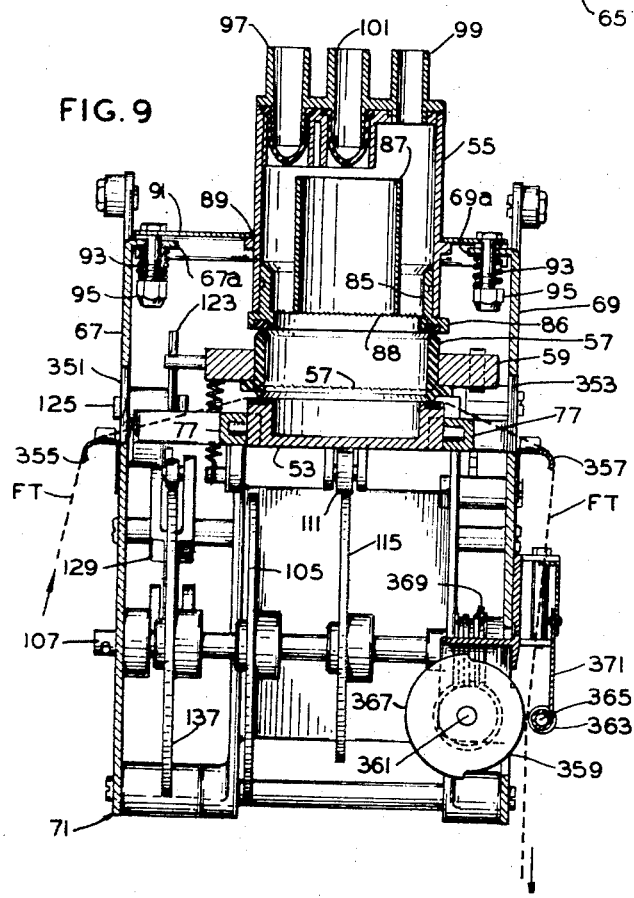
FIG. 9 is a transverse section on line 9—9 of FIG. 5.
Figure 10:
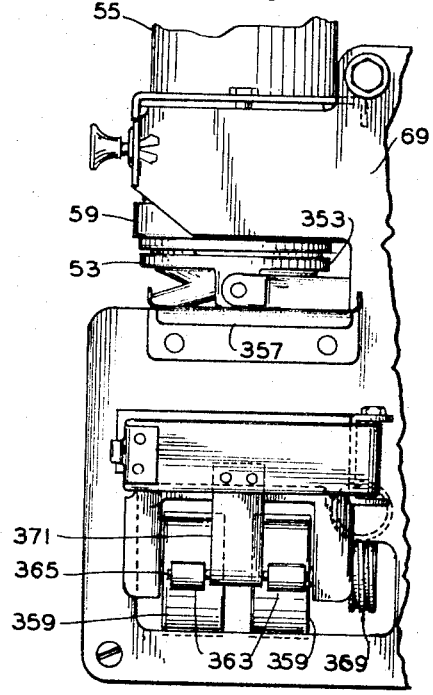
FIG. 10 is a partial right side elevation of FIG. 9.

Lever 63 carries a cam follower roller 103 engaging a cam 105 on a horizontal cam shaft 107 extending between and journalled in the side walls 67 and 69 of the brewer chassis, being biased by a spring 109 for engagement of the roller with the cam. Lever 79, which carries the bottom head or funnel 53, carries a cam follower roller 111 which is biased by a spring 113 into engagement with a second cam 115 on the cam shaft 107. The cams are shown in what may be referred to as their zero or home position in FIG. 2. With cam 105 in this zero or home position, lever 63 occupies its home position of FIG. 2 locating the cup 51 between the bottom head 53 and the pressure vessel 55. With cam 115 in its zero or home position, lever 79 and bottom head 53 occupy the home position of FIG. 2 in which head 53 is partially raised and engages cup 51 to hold its partially raised, but with some clearance between cup 51 and the vessel 55. Head 53 is adapted to swing up from its home position to a raised position as shown in FIGS. 4 and 9 for tightly clamping the cup 51 between head 53 and vessel 55. It is also adapted to swing down to the extreme lowered position shown in FIG. 6 clear of cup 51, the latter then being supported by engagement of a roller 117 on arm 59 with a track 119 on the inside of chassis side wall 69.

The cam shaft 107 carrying cams 105 and 115 is adapted to be driven in clockwise direction as viewed in FIGS. 2–4 and 6–8 by an electric motor 121 (see FIGS. 1 and 13D). This motor, a conventional gearmotor, is referred to as the brewer motor. As will appear, the cam shaft is driven by the motor through a single revolution (through 360° from the zero position) on each brew cycle, the motor stopping after the cam shaft has rotated through the first 16° (approximately) of a revolution to stop the cam shaft for a brew interval, then resuming its operation to complete the rotation of the cam shaft back to the zero position. Cam 115 is developed and phased so as to hold the bottom head 53 in its partially raised home position of FIG. 2 at the 0° cam position, to raise the head 53 to its FIG. 4 cup-clamping position during the initial 16° of rotation of the cam, then to effect lowering of the head 53 to its fully lowered position of FIG. 6 on rotation to 40°, with a dwell of the head in its fully lowered position from 40° to 330°, and then a rise back to the 0° home position. Cam 105 is developed and phased so that lever 63 occupies its home position at 0°, and dwells in its home position from 0° to 16°. On resumption of cam rotation after the stop at 16°, cam 105 swings lever 63 to the left as viewed in FIG. 2 from its FIG. 2 home position to its FIG. 7 position, which may be referred to as its retracted position. This swing of lever 63 to retracted position occurs during rotation of cam 105 from 56° to 96°; then lever 63 dwells in retracted position from 96° around to 287°, and returns to its home position from 287° around to 323°.

Thus, the development and phasing of cams 105 and 115 are such that, on the initial 16° rotation of the cams, lever 63 remains in its home position so that cup 51 remains in its position between the bottom head 53 and pressure vessel 55, and head 53 is raised to clamp the cup 51 against vessel 55, as shown in FIG. 4. With the cup 51 so clamped, brewing of the coffee occurs in a manner to be described. Noting that motor 121 is de-energized for stopping the cams at their 16° position, the head 53 remains in its raised position clamping the cup until operation of the motor is resumed, thus maintaining the brewer in what may be referred to as its sealed condition. On resumption of operation of the motor, and resultant resumption of rotation of the cam shaft 87, the head 53 is lowered to unseal or open up the brewer, and lever 63 is swung out to its FIG. 7 retracted position. This pulls the cup 51 out from between head 53 and vessel 55 to its FIG. 7 position. The lever 63 dwells in its retracted position for an interval as determined by cam 105. During this dwell, arm 59 carrying the cup 51 is rapidly swung counterclockwise on its pivot 61 at the upper end of lever 63 through about 180° to invert the cup 51 with a jarring action for dumping spent coffee grounds from the cup, as shown in FIG. 8. Then the arm 59 is swung back to bring the cup 51 back to its FIG. 7 position. At this point, a fresh charge of ground coffee is delivered by dispenser 3 into the cup. All this occurs during the dwell of lever 63 in its retracted position. Then, lever 63 returns to its FIG. 2 home position, and, toward the conclusion of the cycle, head 53 is raised to its FIG. 2 home position.

The flip-over of the arm 59 and cup 51 to dump the spent coffee grounds is effected by a trip lever 123 pivoted at 125 on the inside of chassis side wall 67, and via an overcentering spring 127 connected between lever 63 and arm 59. The trip lever 123 is normally held in its cocked position of FIG. 2 by a cocking lever 129 pivoted on shaft 65. This cocking lever has a pin 131 at its upper end received in a notch 133 in the trip lever and carries a cam follower roller 135 engaging a third cam 137 on cam shaft 107 under the bias of a spring 139. In the cocked position of the trip lever, an arm 141 on the trip lever is positioned for passage thereover of a pin 143 which extends laterally from the arm 59, this pin also serving for connection of the overcentering spring 127 to arm 59. When the lever 63 has swung out to its retracted position to move the cup 51 out to its FIG. 7 position, and pin 143 has come into position over arm 141 of the trip lever 123, the cam 137 effects a clockwise swing of the cocking lever 129 to swing the trip lever counterclockwise from its FIG. 7 position. Arm 141 of the trip lever 123 engages the pin 143 on arm 59 and swings the arm 59 counterclockwise on its pivot at 61 against the bias of spring 127 until the latter overcenters beyond the axis of the pivot 61, whereupon the spring 127 pulls the arm 59 rapidly downward to the FIG. 8 position, wherein cup 51 is inverted for dumping spent coffee grounds from the cup into the waste can 37. The arm 59, in being flipped over (with accompanying inversion of the cup) strikes stops 144 on wall 69 for jarring the grounds out of the cup.

Referring to FIGS 13A–13D, which show the circuitry for the merchandiser, there is indicated at 145 (FIG. 13A) a switch panel which is provided on the front door of the vendor cabinet (not shown). This panel carries a set of selector switches operable by customers (after insertion of coin) to make various selections. Included here are switch CS operable to obtain coffee with cream and sugar, switch C operable to obtain coffee with cream, switch S operable to obtain coffee with sugar, switch B operable to obtain black coffee, switch T operable to obtain tea (or, alternatively, to obtain decaffeinated coffee), switch XS for obtaining extra sugar with coffee or sugar with tea, switch XC operable to obtain extra cream with coffee or cream with tea, and switch X operable for brewing of extra strong coffee, if desired. The merchandiser may also include systems for vending hot soup and hot chocolate, and switches HS and HC are shown for activating these systems. At 147 (FIG. 13A) is indicated a coin control unit of a conventional well-known type including a coin switch 149 which is a double-throw switch normally closed on an upper contact as illustrated and which closes on a lower contact in response to insertion in the coin slot of the merchandiser of coin in appropriate amount. The movable contact of this switch is grounded as indicated at G1. The coin control unit includes coin return electromagnets 151 and 153. A voltage input for this unit is indicated at VI.

At 155 (FIG. 13A) is indicated a panel carrying two relays, one of which is referred to as a vend relay, and which is designated VR, the other of which is referred to as the common relay, and which is designated CMR. Each of these has four sets of contacts designated a, b, c, d. At 157 (FIG. 13D) is indicated a programmer unit including a timer motor 159, a reset switch 161, a full cycle switch 163, a brew water and time delay switch 165, a first probe switch 167, a second probe switch 169, a chocolate dispenser switch 171, a tea, soup and chocolate water switch 173, a soup dispenser switch 175, a lower brew valve switch 177, a tea dispenser switch 179, an air compressor and vent valve switch 181, a tea cream and sugar switch 183, a cream switch 185, a sugar switch 187, an extra cream switch 189 and an extra sugar switch 191. The timer motor 159 drives a cam shaft indicated at 193 carrying cams for actuating the various switches in the programmer unit. These cams are indicated by the reference numerals for the respective switches plus the subscript c. As will appear, the shaft 193 is driven by motor 159 through a single-revolution cycle in the course of an operating cycle of the vendor. The motor 159 does not operate continuously through a cycle, but stops a number of times before it completes a revolution of shaft 193. The development and phasing of the cams of the programmer unit are shown in FIG. 14, where the 0° or home position of each cam is at the top of the cam, the cams all rotating in unison in clockwise direction as viewed in FIG. 14.

At 193 (FIG. 13D) is indicated a switch grouping comprising a full cycle switch 195 for the brew motor 121, a coffee hopper switch 197, a brew safety switch 199, and a coin return electromagnet switch 200. These switches are controlled by cams 195c, 197c, 199c and 200c on the shaft 107 driven by the brew motor 121. A full cycle switch for the coffee hopper motor 5 is indicated at 201 in FIG. 13D. This is controlled by a cam 201c driven by the coffee hopper motor. The coffee dispenser 3 may be of the type such as shown in the copending coassigned U.S. patent application of Richard N. Modjeski which issued October 1, 1968, as Patent No. 3,403,825.

At 205 (FIG. 13B) is indicated a relay panel carrying a coffee with cream and sugar relay CSR, a coffee with cream relay CR, a coffee with sugar relay SR, a black coffee relay BR, a hot soup relay HSR, a hot chocolate relay HCR, a tea relay TR, a time delay relay TDR, a timer relay TMR, a cleaning relay CLR and a cycle relay CYR. Each of these relays is shown as having four sets of contacts a, b, c and d. The cleaning cycle relay controls a cleaning system such as shown in the copending coassigned U.S. patent application of Alvin W. Holstein and Harry H. Pryor which issued July 2, 1968, as Patent No. 3,390,626, which does not form a part of the present invention. A switch for energizing relay CLR initiating operation of the cleaning system is indicated at CLS. For purposes of this invention, relay CLR may be regarded as always deenergized, so that its contacts remain in the position shown in FIG. 13B.

The motor 25m for augering out cream, the motor 27m for augering out sugar, and the motor 39m for augering out tea appear in FIG. 13C. Also shown are dispenser motors SDM for augering out an instant soup product from a supply (not shown) and CDM for augering out chocolate from a supply (not shown), and motors SBM and CBM for operating soup and chocolate blendors (not shown).

At 207 (FIG. 13B) is indicated a cup dispenser unit which includes the usual cup dispenser motor 209, an indexing motor 211, and a full cycle switch 213 controlled by a cam 215 driven by the motor 209. It also includes a switch 217 controlled by a cam driven by the indexing motor.

At 219 (FIG. 13C) is indicated a timing control module which is shown as having fourteen terminals T1–T14. This module includes a relay 221 having a double-throw set of contacts 221a including a normally closed upper contact connected to terminal T1, a lower contact connected to terminal T2, and a movable contact connected to terminal T3. This relay is energized in response to completion of a circuit between terminals T6 and T7 via a time delay means 223 which functions to deenergize the relay after a predetermined time delay interval following initial energization even though the circuit between terminals T6 and T7 is still closed. The delay interval of the time delay means is determined by the value of the resistance in a circuit 225 between terminals T4 and T5. This resistance circuit includes a first variable resistor or rheostat 227 which is referred to as the normal brew resistor and a second variable resistor 229 which is referred to as the extra strong brew resistor. The latter is normally shorted out of the circuit 225 via a shorting circuit 231 including the extra strong selector switch X, which is normally closed. As long as the extra strong selector switch is closed, the normal brew resistor 227 alone determines the time delay interval, and it may be adjusted for a time delay interval ranging from about one-half to one and one-half seconds. When switch X is opened, the extra strong brew resistor 229 is thrown into circuit 225 in series with the normal brew resistor 227 to determine a longer time delay interval, which may range up to about six seconds total, according to the adjustment of the resistors 227 and 229. Power for the coil of relay 221 is supplied from terminals T13 and T14 via time delay means 223, which may be of any suitable type, such as one comprising a unijunction relaxation circuit in which a timing capacitor is charged through the resistance circuit 225 to provide an adjustable time delay before the voltage on the capacitor reaches the firing level of the unijunction transistor of the relaxation circuit, the firing of the unijunction transistor effecting deenergization of the relay 221 as by means of semiconductor components such as silicon controlled rectifiers and/or transistors.

The module 219 also includes a second relay 233 having a double-throw set of contacts 233a normally closed on an upper contact connected to terminal T8, a lower contact connected to terminal T9, and a movable contact connected to terminal T10. The relay 233 is energized in response to completion of a circuit 235 between terminals T11 and T12 via a time delay means 237 which functions to maintain the energization of the relay 233 for a predetermined time interval, e.g., one second, after opening of the circuit 235 between terminals T11 and T12. This circuit 235 is referred to as the probe circuit, including two electrically conductive probes P1 and P2 (see FIG. 1 as well as FIG. 13C) which extend into the brewed coffee delivery line 13 at a point between the valve 15 and the exit end of line 13 to the mixing bowl. The probes are spaced from one another so that circuit 235 is open in the absence of coffee between the probes. Circuit 235 is closed when there is coffee flowing in line 13 bridging the probes (coffee being sufficiently electrically conductive for this purpose). The time delay means 237 may be of any suitable type, e.g., one including amplifying means for amplifying the current in probe circuit 235 and having a charge storing capacitor for maintaining forward bias on a transistor amplifying stage for a predetermined time interval (e.g., one second) after the bias signal from the probe circuit terminates.

Figure 13A:
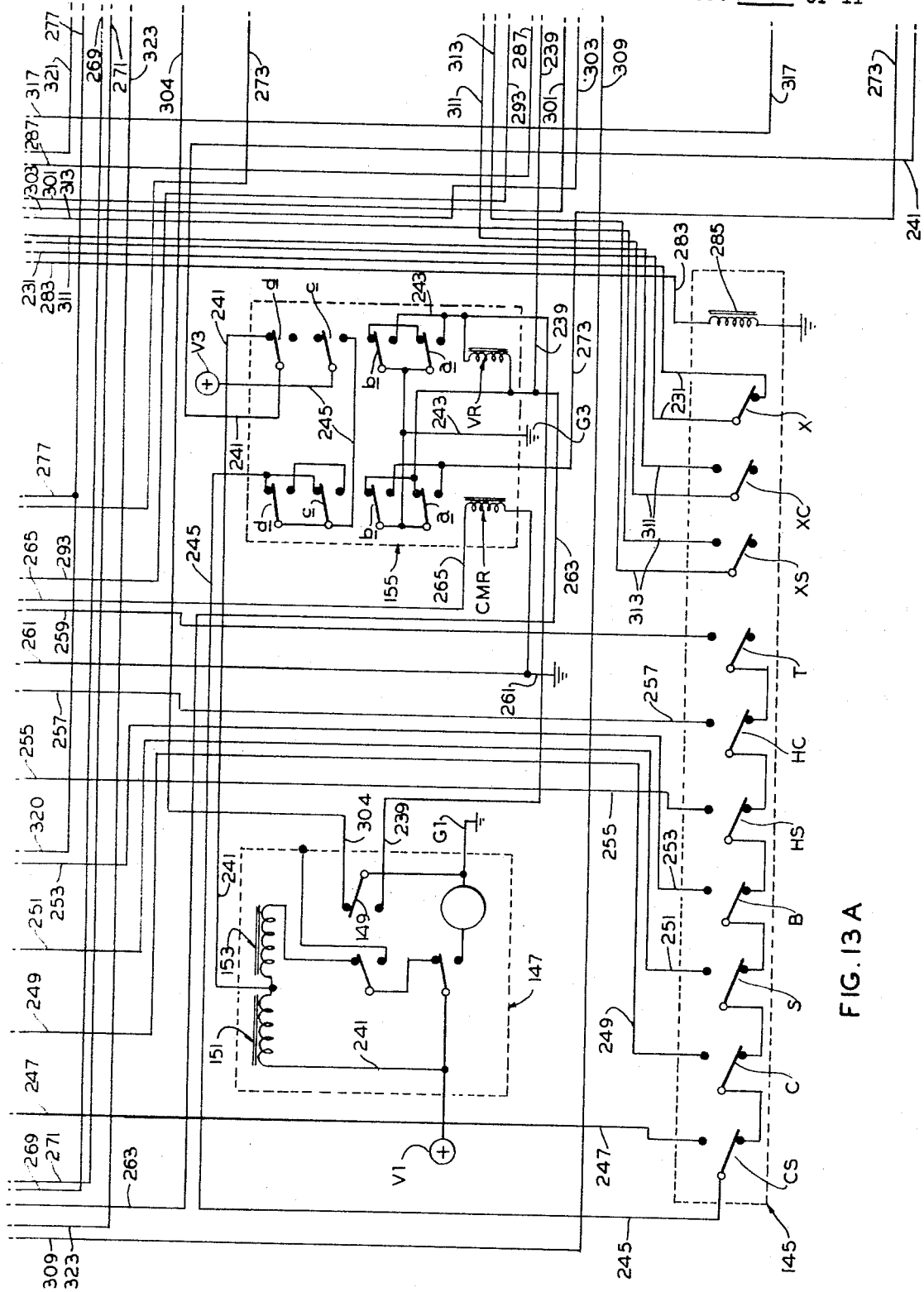
Figure 14:
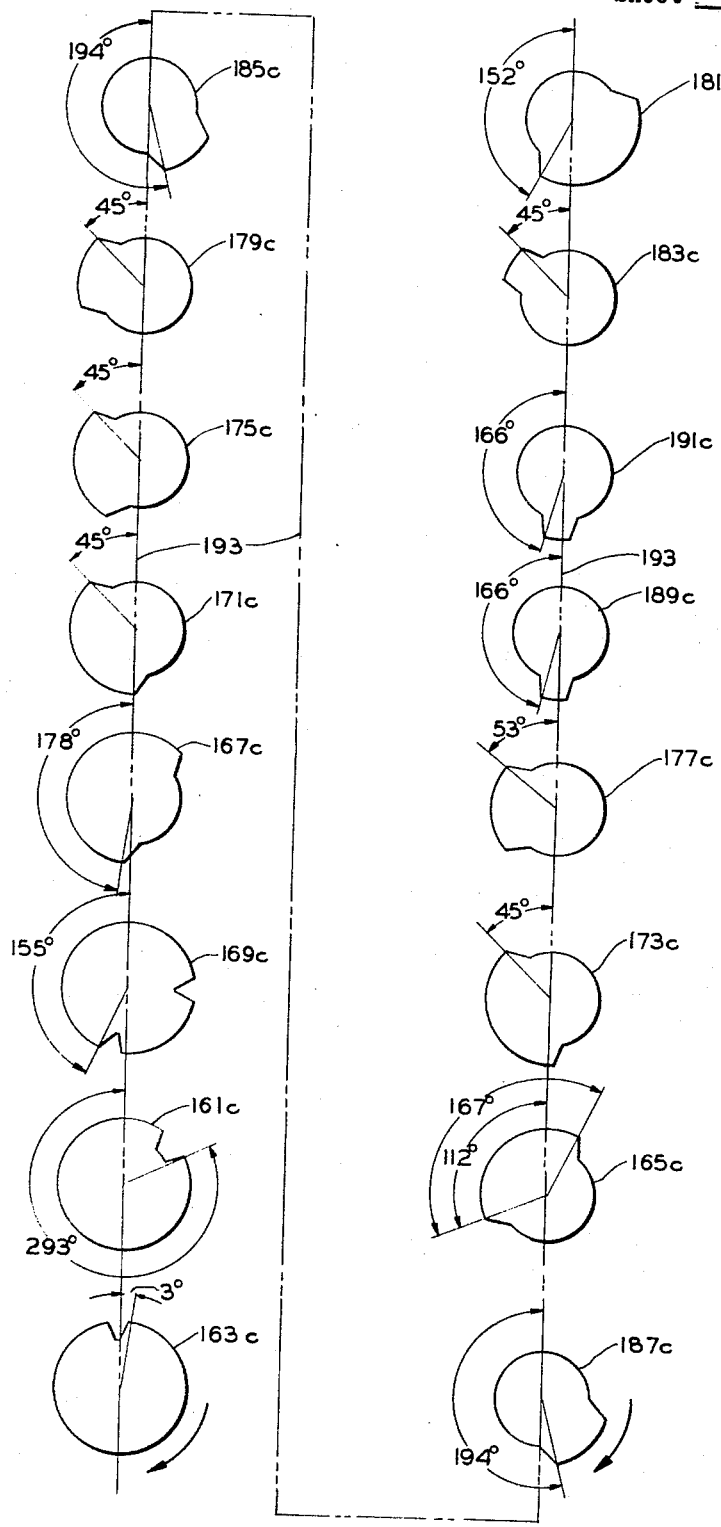
FIG. 14 is a view showing certain cams of a programmer unit.

The coil of the vend relay VR and the reset switch 161 are interconnected in series as indicated at 239 between the lower contact of the coin switch 149 and a voltage source V2, (see FIG. 13D), the movable contact of the coin switch being grounded at G1 (FIG. 13A). The reset switch is normally closed. Thus, with the coin switch on its lower contact in response to insertion by a customer of an appropriate amount in coin, the coil of the vend relay VR is energized from source V2. When it is energized, its contacts d break a circuit 241 for the coin return electromagnets 151, 153 between voltage source V1 and a ground G2 through the coin return electromagnet switch 200. Its contacts a and b establish a holding circuit 243 for the coil of relay VR off line 239 to a ground G3. Its contacts c establish a power circuit 245 for the selector switches CS, C, etc., from a voltage source V3 via contacts c and d of the common relay CMR (which is deenergized at this time). This conditions the merchandiser for activation of one of the selector switches by the customer.

Selector switches CS, C, S, B, HS, HC and T are interconnected with the coils of relays CSR, CR, SR, BR, HSR, HCR and TR, respectively, as indicated at 247, 249, 251, 253, 255, 257 and 259. These coils have a common ground indicated at 21. Thus, on actuation of any of the selector switches CS, C, S, B, HS, HC or T, the coil of the respective relay is energized. On energization of the coil of any one of these relays, its contacts a establish a holding circuit 263, 239 for that coil, through the reset switch 161. Its contacts b establish a circuit 265 (powered from V2 through the reset switch 161 and 239, 263) for the coil of the common relay CMR, grounded to 261. On energization of the coil of any one of relays CSR, CR, SR or BR, which may be referred to as the coffee selection relays, its contacts c establish a circuit 267 for contacts c and d of cycle relay CYR, powered from a voltage source V4 via contacts b of relay CLR. As will appear, this determines that the merchandiser will operate through a coffee brewing cycle on energization of any of the coffee selection relays. Contacts d of relays CSR and CR establish a cream circuit 269 including the cream switch 185 and the cream dispensing motor 25m powered from a voltage source V5. Contacts d of relays CSR and SR establish a sugar circuit 271 including the sugar switch 187 and the sugar dispensing motor 27m also powered from V5. Contacts d of relay BR are not used.

On energization of the coil of the common relay CMR, its contacts a and b establish a circuit 273 between voltage source V4 and ground G3 including the brew safety switch 199, the timer motor 159 and all four contacts of the timber relay TMR, and also establish a circuit 275 for the coil of the cycle relay CYR. The coil of the timer relay TMR is normally energized at the start of a cycle of operation, being connceted in a circuit 277 which may be traced from voltage source V4 through contacts b of relay CLR, 267, terminal T3 of the timing control module 219, the movable contact of relay 221 (normally closed on its upper contact), terminal T1, and the second probe switch 169 to a ground G4. The circuit 275 for the coil of the cycle relay CYR may be traced from voltage source V4 through contacts b of relay CLR, thence through the coil of CYR to an interconnection with circuit 273, ultimately to ground at G3.

On energization of the coil of cycle relay CYR, its contacts a establish a circuit 279 through the full cycle switch 213 of the cup dispenser unit 207 to the cup dispenser motor 209 via a ground connection G5. The motor 209 thereupon operates to dispense a cup to the cup station 31 (FIG. 1) and remains energized until switch 213, under control of cam 215, opens off its left-hand contact, as illustrated, and closes on its right-hand contact. This occurs before the completion of a revolution of the cam 215. When the cycle relay CYR is ultimately deenergized, a circuit 281 is completed via contacts b of the cycle relay and the right-hand contact of switch 213 to home the cup dispenser motor and cam 215. Also, when the cycle relay CYR is energized, its contacts b establish a circuit 283 including a reset solenoid 285 which operates suitable mechanism (not shown herein since it does not constitute part of this invention) for retaining any of switches XS, XC or X which may have been actuated in its actuated position.

Further, when cycle relay CYR is energized, its contacts c establish a circuit 287 for supplying current to those switches in the programmer unit 157 which control brewing of coffee, namely, the brew water and time delay switch 165, the lower brew valve switch 177 and the air compressor and vent valve switch 181. Switch 165 is normally closed on an upper contact connected as indicated at 289 with the brew water valve 9, grounded as indicated at G6. It has a lower contact connected as indicated at 293 to the coil of time delay relay TDR. Switch 177 is a normally open switch connected as indicated at 295 with the lower brew valve 15 via a ground connection G7. Switch 181 is a normally open switch connected as indicated at 299 with the motor 23 for air compressor 17 and with the vent valve 21.

Additionally, when cycle relay CYR is energized, its contacts d establish a circuit 301 via the brew motor full cycle switch 195 to the brew motor 121 and thence to the ground connection G7. This starts the brew motor 121 in operation. When the brew motor has rotated cam shaft 107 through 16° to the point where the bottom head 53 of the brewer has been raised to clamp the cup 51 (FIG. 4), the brewer motor full cycle switch 195, under control of cam 195c, drops off its upper contact as shown to stop the brew motor 121, and on to its lower contact which is connected as indicated at 303 to the upper of contacts a of the cycle relay CYR. At this point, cam 200c opens the coin return electromagnet switch 200.

The timer motor 159 starts operation through a cycle on energization of common relay CMR in response to actuation of a selector switch, the motor circuit 273 being completed through the closed contacts of the timer delay TMR and the brew safety switch 199 (which is closed). As appears from FIG. 14, cam 163c on cam shaft 193 driven by the timer motor is developed and phased to close the full cycle switch 163 on its lower contact as shown immediately on start-up of the timer motor and to hold it on its lower contact for a full revolution of the cam, whereupon it throws switch 163 back on its upper contact. The speed of the motor 159 may be such that one full revolution of the cam shaft 193 would occur in about 12.7 seconds, if uninterrupted. However, as noted above, the motor stops at least twice and may stop again before completion of a revolution of shaft 193. The full cycle switch 163 is connected in a circuit 304 between the upper contact of coin switch 149 and line 273. Cam 165c is developed and phased to throw the brew water and time delay switch 165 onto its lower contact about four seconds after start-up. When switch 165 is thrown onto its lower contact four seconds after start-up, the coil of time delay relay TDR is energized via line 293. On such energization of the coil of relay TDR, its contacts a–d complete a circuit 305 between terminals T6 and T7 of the timing control module 219. As previously mentioned, the coil of the timer relay TMR is normally energized at the start of a cycle of operation via circuit 277. However, when circuit 305 is completed between terminals T6 and T7 of the timing control module, relay 221 is energized to break the circuit 277, deenergizing the timer relay TMR, and thereby breaking the timer motor circuit 273 and deenergizing the timer motor 159. The timer motor remains deenergized for the time delay interval determined by the time delay means 223 of the timing control module. At the end of this time delay interval, relay 221 is deenergized, thus re-establishing circuit 277, re-energizing the timer relay TMR, and re-establishing the timer motor circuit 273 to resume operation of the timer motor. The time delay interval may be a normal time delay interval, as determined by the resistor 227 alone, or an extra strong interval, as determined by both resistors 227 and 229 if the extra strong switch X is actuated. This interval, whatever its duration, is the interval in which coffee is brewed in the brewer 1.

When the timer motor 159 starts up again at the conclusion of the brew interval (as determined by the timing control module 219 and resistor 227 alone or resistors 227 and 229), the cam 181c on the shaft 193 driven by the timer motor closes the air compressor and vent valve 181. This establishes circuit 299 to close the vent valve 21 to operate the motor 23 for driving the compressor 17 to deliver compressed air via line 19 to the brewer to force the brewed coffee out of the brewer. Also at this time, cam 177c closes the lower brew valve switch 177 to establish circuit 295 for the lower brew valve 15 to cause this valve to open for delivery of coffee from the brewer through line 13 to the mixing bowl 11.

During the time that the air compressor is in operation, cam 169c opens the second probe switch 169. If coffee from the brewer has not yet reached the probes P1 and P2, meaning that the probes are electrically disconnected, the timer relay circuit 277, which includes the second probe switch 169, is broken, as a result of which the timer relay TMR is deenergized and the timer motor 159 stops, and remains stopped until coffee reaches the probes. If the coffee has reached the probes, meaning that the probes are electrically interconnected by the coffee, the timer relay TMR remains energized, and the timer motor 159 remains in operation, via a holding circuit 307 for the timer relay which includes the upper contact of first probe switch 167 and terminals T9 and T10 of the timing control module 219. The reason for stopping the timer motor if the coffee from the brewer has not yet reached the probes is to prevent dispensing of cream and/or sugar into the dry mixing bowl 11.

Assuming that coffee from the brewer has reached the probes P1 and P2, and that the latter, sensing the presence of coffee, have maintained the timer motor 159 in operation, the next occurrence is the dispensing of cream and/or sugar into the coffee flowing through the mixing bowl 11, if the selection has been a cream and/or sugar selection. Dispensing of cream occurs in response to closure of the cream switch 185 by cam 185c, with resultant establishment of the cream circuit 269. Dispensing of sugar occurs in response to closure of the sugar switch 187 by cam 187c, with resultant establishment of the sugar circuit 271.

The extra cream and extra sugar switches 189 and 191 are double-throw switches normally closed on their upper contacts as shown in FIG. 13D. When the tea relay TR is deenergized, its upper contacts $d$ establish a circuit 309 to the lower contacts of these switches. The movable contact of the extra cream switch 189 is connected in series with the extra cream selector switch XC and the cream dispenser motor 25m as indicated at 311. The movable contact of the extra sugar switch 191 is connected in series with the extra sugar selector switch XS and the sugar dispenser motor 27m as indicated at 313. To obtain coffee with extra cream, the customer actuates the extra cream selector switch XC in addition to switch C. Switch XC is latched in closed position by the latch mechanism above mentioned. In the course of the cycle, with the timer motor 159 in operation and with coffee flowing through the mixing bowl 11, the extra cream switch 189 is closed on its lower contact by cam 189c to energize cream dispenser motor 25m for an interval to dispense an extra amount of cream. To obtain extra sugar, the customer actuates the sugar selector switch XS in addition to switch S. Switch XS is latched in closed position by the latch mechanism above mentioned. In the course of the cycle, with the timer motor 159 in operation and with coffee flowing through the mixing bowl 11, the extra sugar switch 191 is closed on its lower contact by cam 191c to energize sugar dispenser motor 27m for an interval to dispense an extra amount of sugar. To obtain coffee with extra cream and sugar, the customer actuates both switches XC and XS in addition to switch CS.

Cam 167c for the first probe switch 167 is developed and phased to drop this probe switch onto its lower contact during the interval when cream and/or sugar is being dispensed into the mixing bowl, to complete a circuit 315 to terminal T8 of the timing control module 219.

After the dispensing of cream and/or sugar, cam 169c for the second probe switch 169 again opens the latter (cam 169c having a second notch for this purpose), and this stops the timer motor 159, under control of the probes. The timer motor remains deenergized until the coffee has flowed past the probes, and for one second thereafter, and then relay 233 in the module 219 is deenergized.

The coffee hopper motor 5 is connected in a circuit 317 including the full cycle switch 201 to ground. The coffee hopper switch 197 is connected as indicated at 319 in parallel with switch 201 to ground. The arrangement is such that when switch 197 is closed by cam 197c, the coffee hopper motor 5 is energized via 317 and 319 and then the full cycle switch 201 is closed by cam 201c to take over energization of the motor 5 until it completes a cycle.

On actuation of any one of selector switches HS, HC or T for soup, chocolate or tea, with resultant energization of the respective relay HSR, HCR, or TR, its contacts $b$ establish circuit 265 for the coil of the common relay CMR, as above noted. On such energization of the common relay, the timer motor circuit 273 and cycle relay circuit 275 are established in the same manner as above noted, a cup is dropped and the timer motor 159 starts running. However, under these circumstances, circuit 267 to contacts $c$ and $d$ of the cycle relay is not established (actuation of one of the coffee selection relays CSR, CR, SR, or BR being required for this). Thus, no current is supplied to those switches on the programmer unit which relate to brewing of coffee and no current is supplied to the brewer motor. A series circuit 320 is provided through the upper of contacts $c$ of relays CSR, CR, SR and BR to circuit 277. This provides for continuous operation of the timer motor 159 through a full cycle (one revolution of cam shaft 193) without stopping under control of the full cycle switch 163 for the timer motor.

When the hot soup relay HSR is energized, its contacts $d$ establish a circuit 321 including the soup dispenser switch 175 and the soup dispenser motor SDM. When the hot chocolate relay HCR is energized, its contacts $d$ establish a circuit 323 including the chocolate dispenser switch 171 and the chocolate dispenser motor CDM. When the tea relay TR is energized its contacts $d$ establish a circuit 325 including the tea dispenser switch 179 and the tea dispenser motor 39m. The lower of contacts $c$ of relays HSR, HCR and TR are respectively interconnected through a soup water valve 327, a chocolate water valve 329 and the tea water valve 45 to a ground at G8 via lines 331, 333 and 335. The upper of contacts $c$ of relays HSR, HCR and TR are adapted to be powered via a line 337 including the tea, soup and chocolate water switch 173. The arrangement is such that on actuation of selector switch HS for hot soup, with resultant energization of relay HSR, motor SDM is energized for an interval determined by the interval of closure of switch 175 by cam 175c to dispense a measured amount of instant soup, and valve 327 is energized for an interval determined by the interval of closure of switch 173 by cam 173c to dispense a measured amount of water to blend with the instant soup. On actuation of selector switch HC for hot chocolate, with resultant energization of relay HCR, motor CDM is energized for an interval determined by the interval of closure of switch 171 by cam 171c to dispense a measured amount of chocolate, and valve 329 is energized for an interval determined by the interval of closure of switch 173 to dispense a measured amount of hot water to blend with the chocolate. On actuation of selector switch T for hot tea, with resultant energization of relay TR, motor 39m is energized for an interval determined by the interval of closure of switch 179 by cam 179c to dispense a measured amount of instant tea, and valve 45 is energized for an interval determined by the interval of closure of switch 173 to dispense a measured amount of hot water to blend with the instant tea. On the dispensing of soup or chocolate, the soup blendor motor SBM and the chocolate blendor motor CBM are energized via circuits 339 and 341.

The tea cream and sugar switch 183 is connected in a circuit 343 between the movable contactor of the tea dispenser switch 179 and the upper contacts of the extra cream and extra sugar switches 189 and 191. The customer is instructed to actuate the extra cream selector switch XC for cream with tea, or the extra sugar switch XS for sugar with tea, or both for cream and sugar with tea. The arrangement is such that, on actuation of selector switch T and switches XC and XS for tea with cream and sugar, the timer motor 159 is set into operation for a full uninterrupted one-revolution cycle of cam shaft 193. On closure of the tea dispenser switch 179 by cam 179c, the tea dispenser motor 39m is energized via circuit 325 for an interval to dispense a measured amount of tea into the mixing bowl 41, and on closure of the tea, soup and chocolate water switch 173 by cam 173c, the tea water valve 45 is energized via circuit 335 for an interval to dispense a cup of hot water into the bowl 41. The hot tea thus produced flows to the mixing bowl 11 and thence to the cup C. On closure of the tea cream and sugar switch 183 by cam 183c, circuits 269 and 271 for the cream and sugar dispenser motors 25m and 27m are completed via line 343 through the extra cream and extra sugar switches 189 and 191 (closed on their upper contacts at this time) and circuits 311 and 313 (closed through the closed extra cream and extra sugar selector switches XC and XS). The motors 25m and 27m are held in operation for an interval determined by the tea cream and sugar switch cam 183c. Thus, the amounts of cream and sugar dispensed for tea are determined by the special tea cream and sugar switch cam 183c, not by the extra cream and sugar cams 189c and 191c, although cream and sugar for tea are obtained by actuating the extra cream and sugar selector switches XC and XS. It will be apparent that cream alone may be obtained for tea by actuating switch XC only, and sugar alone may be obtained for tea by actuating switch XS only.

If after deposit of coin, with resultant energization of the vend relay VR, the customer actuates selector switch HS for hot soup, the soup relay HSR is energized via the soup relay circuit 255 and a cup of soup is vended as above described. If he actuates selector switch HC for hot chocolate, the chocolate relay HCR is energized via the chocolate relay circuit 257 and a cup of chocolate is vended as above described. If he actuates selector switch T for tea, the tea relay TR is energized via the tea relay circuit 259, and a cup of tea is vended as above described. If he desires cream with the tea, he actuates the extra cream switch XC; if he desires sugar he actuates the extra sugar switch XS; if he desires cream and sugar he actuates both switches XS and XC.

Referring to FIG. 15, each of the probes P1 and P2 is shown to extend downward into the line 13 through a chamber 351 adapted to trap air when brewed coffee flows through the line to prevent the brewed coffee from contacting the upper ends of the chambers and hence from contacting the upper ends of the probes. This prevents build-up of scale in the line 13 bridging the probes, so as to prevent shorting out of the probes. As shown, line 13 has a tubular section 353 of plastic material, and two short lengths of plastic tubing 355 extending upward from section 353. Each probe extends downward from a head 357 threaded in the upper end of the respective length of tubing 355. The probes are cylindrical metal rods of smaller diameter than the inside diameter of the lengths of tubing 355, and are centered in the latter and out of contact therewith, except where heads 357 are threaded in the lengths of tubing 355.

Figure 3:
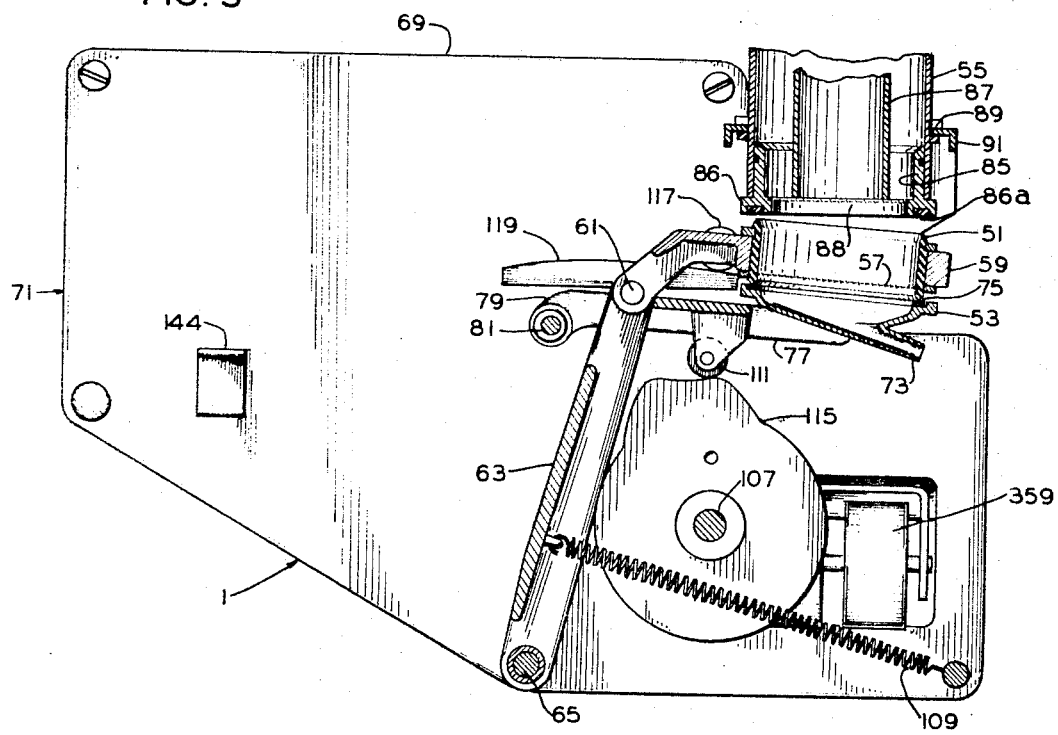
FIG. 3 is a longtudinal section through the FIG. 2 brewer, taken on line 3—3 of FIG. 5.

Operation is as follows:

At the start of a cycle, the bottom head 53 and the cup 51 of the brewer 1 occupy their home position as illustrated in FIGS. 2 and 3, with the bottom head 53 partially raised and engaging the cup, and with the cup partially raised but somewhat below the bottom of the brew vessel 55. The cup 51 holds a charge of ground coffee, previously delivered thereto from the ground coffee dispenser 3 toward the conclusion of the previous brew cycle.

On deposit of the requisite amount in coin by a customer, coin switch 149 closes on its lower contact. This establishes circuit 239 for the coil of the vend relay VR via the reset switch 161, which is closed at this time. On the resultant energization of the coil of the vend relay VR, its contacts $a$ and $b$ establish holding circuit 243 to hold the coil energized and its contacts $c$ establish the power circuit 245 for the selector switches CS, C, S, B, HS, HC and T. Its contacts $d$ break the circuit 241 for the coin return electromagnets 151 and 153 which, as will be understood, function when deenergized to return subsequently deposited coins.

Assuming that the customer actuates selector switch CS to obtain a cup of regular strength coffee with cream and sugar, the coffee with cream and sugar relay CSR is energized via the respective relay circuit 247. Contacts $a$ of relay CSR then establish the holding circuit 263, 239 for the relay, its contacts $b$ establish circuit 265 for the coil of the common relay CMR, its contacts $c$ establish circuit 267 for contacts $c$ and $d$ of the cycle relay CYR, and its contacts $d$ establish circuits 269 and 271 to the cream and sugar switches 185 and 187, which are open at this time.

On energization of the coil of the common relay CMR, its contacts $a$ and $b$ establish timer motor circuit 273 (through the contacts of the timer relay TMR and the brew safety switch, all closed at this time). This starts the timer motor 159 running. The circuit 275 for the coil of the cycle relay CYR is also established. On energization of the coil of the cycle relay CYR, its contacts $a$ establish circuit 279 for the cup dispenser unit 207 which then functions to drop a cup to the cup station 31 of the vendor. Its contacts $c$ establish the power circuit 287 for switches 165, 177 and 181 of the programmer unit 157. Its contacts $d$ establish circuit 301 for the brew motor 121, which starts running.

With the brew motor 121 in operation, the cam shaft 107 driven thereby starts rotating through a single-revolution brew cycle. During the first 16° of revolution of the shaft, cam 115 raises the bottom head 53 and the cup 51 to the raised position shown in FIGS. 4 and 9 in which the cup is tightly clamped and sealed between the bottom head 53 and the brew vessel 55. At this point, cam 195c drops the full cycle switch 195 to break the brew motor circuit 301 to stop the brew motor 121, and the brew motor remains deenergized until the brewing of coffee in the brewer has been completed and the brewed coffee has all been discharged from the brewer, as will appear. This sealing of the brewer occurs very quickly, in less than one-half second. Also, cam 200c opens switch 200.

On energization of the cycle relay CYR, and resultant establishment of the power circuit 287, the brew water valve 9 is energized via circuit 289, the brew water and time delay switch 165 being closed at this time on its upper contact. This opens the valve 9 to initiate flow of hot water from the tank HWT via line 7 to the brew vessel 55. While this flow starts before the brewer is sealed, the brewer is sealed very quickly before the water reaches the vessel 55. Meanwhile, the timer motor 159 has been running to drive the cam shaft 193. After an interval of approximately four seconds from the start of operation of the timer motor and the start of delivery of water to vessel 55, cam 165c on shaft 193 drops the switch 165 onto its lower contact. This breaks the brew water valve circuit 289 to deenergize valve 9 and cut off the delivery of water to the vessel 55. In the four-second interval, approximately one cup of hot water is delivered to the vessel 55. Closure of switch 165 on its lower contact establishes circuit 293 for the coil of the time delay relay TDR.

The hot water, entering the vessel 55, passes through the screen 88 at the bottom of the vessel 55 into the cup 51, and stirs up the coffee grounds in the cup, causing them to rise in the cup up to the screen 88 at the bottom of vessel 55 so that substantially all the particles of ground coffee become soaked with hot water, after which the soaked particles start settling into a bed on the filter screen 57. The charge of ground coffee is confined in the chamber defined by the screens 57 and 88 and the wall of the cup, and the volume of the charge is less than the volume of this chamber so that the ground coffee is loose in the chamber. The hot water is held in the cup 51 and vessel 55 for a brew interval (in this instance, a normal brew interval since the customer did not select extra strong coffee) determined by the time delay means 223 of the timing control module 219, in accordance with the resistance set into the module by the resistor 227.

The timing of the brew interval by module 219 results from energization of the coil of time delay relay TDR on closure of switch 165 by cam 165c at the termination of the brew water delivery. On energization of the time delay relay TDR, its contacts $a$–$d$ complete the circuit 305 between terminals T6 and T7 of the module 319, and this results in energization of the relay 221.

On energization of relay 221, timer relay circuit 277 is broken, resulting in deenergization of the timer relay TMR. Its contacts thereupon open, breaking the timer motor circuit 273. The timer motor 159 thereupon stops. Relay 221 remains energized to maintain the timer motor deenergized for the brew interval, as determined by the time delay imposed by time delay means 223 in accordance with the setting of resistor 227. At the end of this interval, relay 221 is deenergized to reestablish the timer motor circuit 277.

In the event the customer had desired extra strong coffee, he would have actuated the extra strong selector switch X, with resultant inclusion in the control circuit 225 for time delay means 223 of resistor 229 in addition to resistor 227. This would have resulted in a longer brew interval for brewing extra strong coffee.

On resumption of operation of the timer motor 159 at the conclusion of the brew interval, cam 181c closes the air compressor and vent valve switch 181, completing circuit 299 to energize the air compressor motor 23 and the vent valve 21 (closing the latter). Cam 177c closes the lower brew valve switch 177 to complete circuit 295 to energize the lower brew valve 15, opening the latter. The air compressor 17 delivers compressed air to vessel 55 to force the brewed coffee out of vessel 55 and cup 51 through the bed of grounds on the screen 57 and through the screen 57, and thence through the bottom head 53 and line 13 to the mixing bowl 11.

While the air compressor 17 is in operation to deliver compressed air to the brewer to force out the coffee, cam 169c opens the second probe switch 169.

If the coffee has reached the probes, providing a conductive path across the probes, the holding circuit 307 for the timer relay TMR is established to maintain the timer motor in operation. This holding circuit may be traced from V4 via part of 277 to 307, and via 307 through the upper contact of the first probe switch 167 (which is closed in its upper contact at this time) back to line 277 in a parallel circuit around the second probe switch 169. However, if the coffee being forced out of the brewer has not yet reached the probes P1 and P2, the circuit 277 for the timer relay TMR is broken, and its contacts open to break the timer motor circuit 273 and deenergize the timer motor 159. The timer motor is then held out of operation until the coffee reaches the probes, which results in re-energization of the timer relay TMR and re-energization of the timer motor. The reason for stopping the timer motor if coffee has not reached the probes is to delay dispensing of cream and sugar to insure that the cream and sugar is not dispensed into the dry mixing bowl 11. In other words, dispensing of cream and sugar is withheld until coffee is flowing through the mixing bowl.

With the timer motor 159 continuing in operation, or resuming operation when coffee reaches the probes P1 and P2, the next phase in the cycle is the closing of the cream and sugar switches 185 and 187 by cams 185c and 187c to establish the circuits 269 and 271 for the cream dispenser motor 25m and the sugar dispenser motor 27m to auger out predetermined amounts of cream and sugar into the coffee flowing through the mixing bowl 11. The amounts are dependent upon the time of operation of the augers 25a and 27a by motors 25m and 27m as determined by the development of the cream and sugar switch cams 185c and 187c.

During the time the cream and sugar are being dispensed, cam 167c effects closing of the first probe switch 167 on its lower contact. This establishes circuit 315 to terminal T8 of the timing control module 219, which conditions the probes P1 and P2 to sense for completion of flow of coffee past the probes (absence of coffee from the probes), as distinguished from their previous function of sensing for arrival of coffee at the probes (presence of coffee at the probes).

After conclusion of the dispensing of the cream and sugar, the second probe switch 169 is opened a second time by cam 169c, which has two notches as shown in FIG. 14 for this purpose. This breaks the timer relay circuit 277, to deenergize the timer relay TMR and thereby break the timer motor circuit 273 to stop the timer motor 159. The timer motor remains stopped until the timing control module times out a one-second delay interval following the completion of flow of coffee past the probes. This one-second delay compensates for any air bubbles in the stream of coffee and delays the next step in the cycle until all the coffee is out of line 13. Thus, the timer motor remains stopped until one second after the coffee has completed its flow past the probes. This results from the fact that, as long as the probes P1 and P2 are bridged by coffee, the probe circuit 235 is closed to maintain relay 233 energized, thereby dropping the movable contact of the relay 233 onto its lower contact and establishing circuit 307, but since probe switch 167 is on its lower contact maintaining circuit 315, the timer relay TMR remains deenergized. As soon as the coffee has completed its flow past the probes, the time delay means 237 starts timing out the one second delay, and at the end of this one second delay the relay 233 is deenergized so that its movable contact opens from its lower contact and closes on its upper contact. When this occurs, circuit 315 is completed to the first probe switch and this results in energization of the timer motor 159 again. Energization of relay TMR here is from voltage input V4 via 267, 277, 307, switch 167 closed on its lower contact, 315, terminal T8 of module 219, the movable contact of relay 233 closed on its upper contact, terminal T10 of module 219, 307 and 277 through the coil of relay TMR to ground. With relay 277 energized, the timer motor is energized via 273.

On resumption of operation of the timer motor 159 after the coffee has exited from line 13, cam 181c opens the air compressor and vent valve switch 181 to stop the air compressor 17 and open the vent valve 21. Following this, cam 161c opens the reset switch 161. This breaks circuit 239 to deenergize the vend relay VR and also breaks the holding circuit 263 for relay CSR. On deenergization of relay CSR, the circuit 265 for the common relay CMR is opened, and this relay is deenergized. The first probe switch 167 is closed back on its upper contact by cam 167c, the reset switch 161 is closed by cam 161c, and finally the full cycle switch 163 is opened by its cam 163c. On opening of switch 163, the timer motor 159 and the cycle relay CYR are deenergized.

On deenergization of the cycle relay CYR, its contacts b complete circuit 281 to reset the cup dispenser unit 207 for the next vend. Its contacts a establish circuit 303 for the brewer motor 121 via the brewer motor full cycle switch 195 (which at this time is closed on its lower contact). This starts the brewer motor running again to drive the cam shaft 107. Immediately after start-up of the brew motor, cam 199c on shaft 107 opens the brew safety switch 199. This opens circuit 273 to lock out the vend circuitry as a safety measure. It will be recalled that the cam shaft 107 had previously stopped after rotating through 16° from its home position. As it rotates from the 16° position to the 40° position, cam 115 allows the bottom head 53 to swing down to its fully lowered position of FIG. 6. The cup 51 thereupon swings down to the extent shown in FIG. 6, clear of the bottom of the brew vessel 55. The bottom head 53 dwells in its fully lowered position of FIG. 6 as cam 115 rotates from 40° to 330°. As cam 105 rotates from 56° to 96°, it swings lever 63 to its retracted position of FIG. 7, and this pulls the cup 51 out from between the brew vessel 55 and the bottom head 53 to its FIG. 7 position. The lever 63 dwells in its FIG. 7 position as cam 105 rotates from 96° to 287°. During this dwell, cam 137 on the cam shaft 107 acts via the cocking lever 129 and trip lever 123 to flip over the arm 59 and cup 51 as shown in FIG. 8 to dump spent coffee grounds from the cup 51. Following this, the cam 137 effects return of the cocking lever to re-cock the trip lever and return the arm 59 and the cup 51 to the FIG. 7 retracted position.

Figure 7:
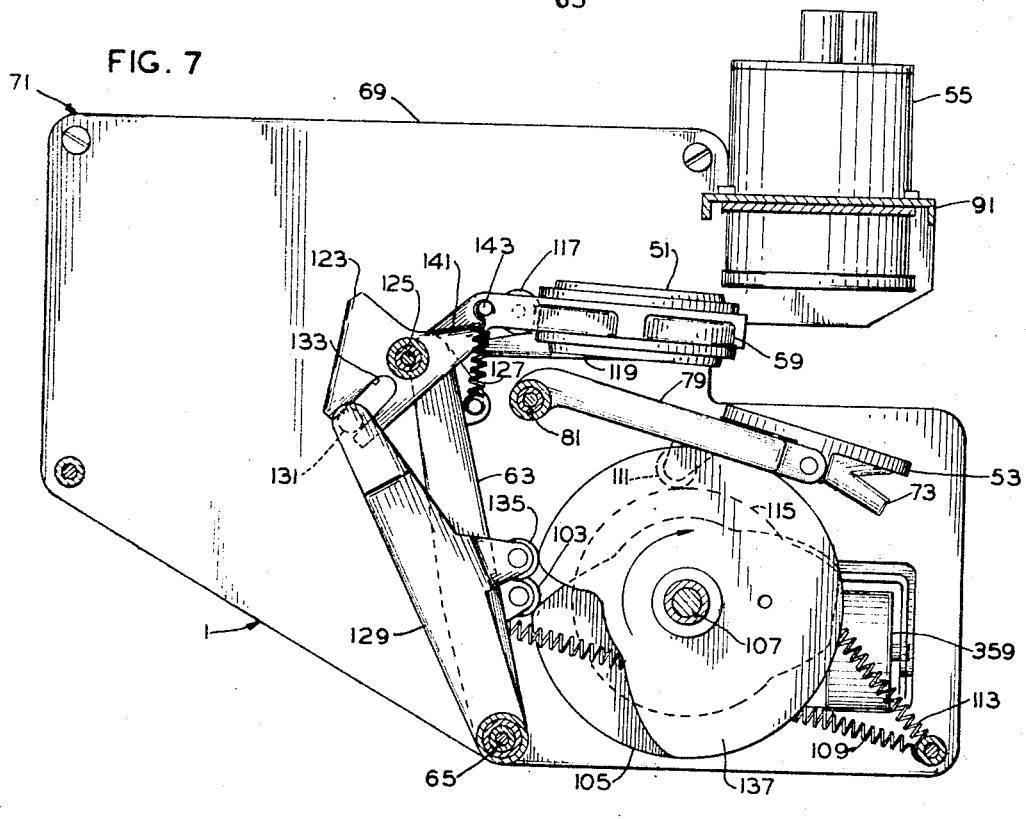
FIGS. 7 and 8 are views similar to FIG. 6 showing further moved positions of parts.
Figure 8:
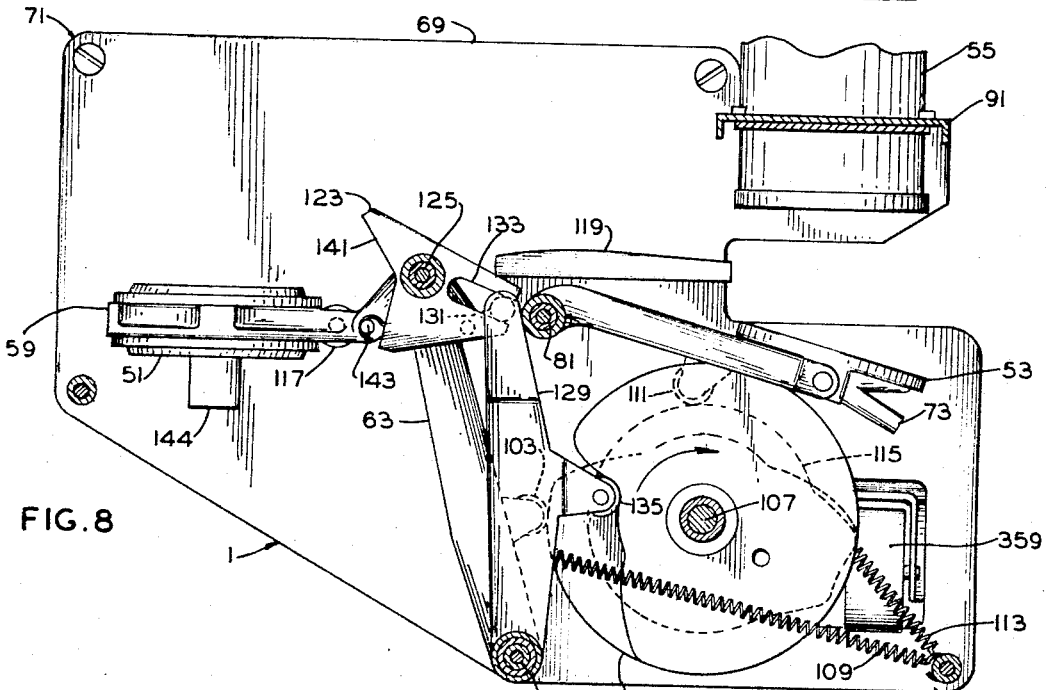

When the cup 51 returns to the FIG. 7 retracted position after the dumping of the spent coffee grounds from the cup, cam 197c closes switch 197 to complete the circuit 319 for the coffee hopper motor 5, which then operates through a cycle to dispense a measured amount of ground coffee into the cup in preparation for the next vend cycle. Then, as cam 105 rotates from 287° back to home position, lever 63 is swung back to its FIG. 6 home position, bringing the loaded cup 51 back into position between the bottom head 53 and the brew vessel 55, and cam 115, on rotation from 330° back to home position, raises the bottom head and the cup back to their home position of FIG. 2. As cam shaft 107 attains its home position, cams 195c, 199c and 200c raise switches 195, 199 and 200 and the brewer motor 121 stops, thus concluding a cycle.

Assuming that the customer actuates selector switch C to obtain coffee with cream only, the coffee with cream relay CR is energized via the respective relay circuit 249. Contacts a of relay CR establish holding circuit 263, 239 for the relay, its contacts b establish circuit 265 for the common relay CMR, its contacts c establish circuit 267 for contacts c and d of the cycle relay CYR, and its contacts d establish circuit 269 to the cream switch 185. Operation then proceeds as above described except that cream only is dispensed.

Assuming that the customer actuates selector switch S to obtain coffee with sugar only, the coffee with sugar relay SR is energized via circuit 251. Contacts a of relay SR establish holding circuit 263, 239 for the relay, its contacts b establish circuit 265 for the common relay CMR, its contacts c establish circuit 267 for contacts c and d of the cycle relay CYR, and its contacts d establish circuit 271 to the sugar switch 187. Operation then proceeds as above described except that sugar only is dispensed.

Assuming that the customer actuates selector switch B to obtain black coffee, the black coffee relay BR is energized via circuit 253. Contacts a of relay BR establish holding circuit 263, 239 for the relay, its contacts b establish circuit 265 for the common relay CMR, and its contacts c establish circuit 267 for contacts c and d of the cycle relay. As above noted, contacts d of relay BR are not used. Operation proceeds as above described except that neither cream nor sugar is dispensed.

If the customer should desire extra cream with coffee, he actuates the extra cream selector switch XC, this switch becoming latched in closed position on being actuated as a function of solenoid 285 becoming energized in response to energization of the cycle relay CYR. This conditions the extra cream circuit 311 for energization from line 309 when the extra cream switch 189 is closed by cam 189c to energize the cream dispenser motor 25m to dispense cream. This energization is for an interval determined by cam 189c such as to dispense an extra amount of cream (in addition to that dispensed under control of the cream cam 185c). On ultimate deenergization of relay CYR, solenoid 285 is deenergized and switch XC opens.

If the customer should desire extra sugar with coffee, he actuates the extra sugar selector switch XS, which becomes latched in closed position as a function of solenoid 285 becoming energized in response to energization of cycle relay CYR. This conditions the extra sugar circuit 313 for energization from line 309 when the extra sugar switch 191 is closed by cam 191c to energize the sugar dispenser motor 27m to dispense sugar. This energization is for an interval determined by cam 191c such as to dispense an extra amount of sugar (in addition to that dispensed under control of the sugar cam 187c). On ultimate deenergization of relay CYR, solenoid 285 is deenergized, and switch XS opens.

In the case of the vending of tea, the customer, after deposit of coin, actuates selector switch T. This effects energization of the tea relay TR via the tea relay circuit 259 powered from circuit 245, as a result of energization of the vend relay VR due to a closure of the coin switch 149 on its lower contact. On energization of the tea relay TR, the timer motor 159 operates for a full single-revolution cycle of cam shaft 193 without stopping. Cam 179c closes switch 179 to energize motor 39m for an interval to dispense a measured amount of instant tea from dispenser 39 into the bowl 41, and cam 173c closes switch 173 for an interval to dispense a cup of hot water from tank HWT via line 43 to blend with the instant tea in the bowl 41. The resultant hot tea flows through line 47 to bowl 11, where cream is added if the customer has actuated selector switch XC, sugar is added if the customer has actuated selector switch XS, and cream and sugar are added if the customer has actuated both switches XC and XS.

The merchandiser may be used to vend decaffeinated coffee instead of tea simply by using dispenser 39 to dispense instant decaffeinated coffee instead of tea, in which case selector switch T is suitably labled to note that it is for decaffeinated coffee.

As an optional auxiliary, the brewer 1 may be equipped with means for feeding a filter tape FT between the cup 51 and the bottom head 53 when the latter is lowered. As shown, the side walls 67 and 69 of the brewer chassis are provided with openings 351 and 353 for passage of the filter tape FT from a supply roll (not shown) between the cup 51 and the head 53, suitable guides 355 and 357 being provided on the side walls for the tape. The tape travels downward from guide 357 between a pair of drive rolls 359 on a shaft 361 and a pair of pressure rolls 363 on a shaft 365. Rolls 359 have raised arcuate sectors 367. Shaft 361 is adapted to be driven from cam shaft 107 via worm gearing as indicated at 369. Shaft 365 is carried by a leaf spring 371. The raised sectors 367 of rolls 359 are developed and phased so as to effect intermittent feed of the filter tape FT after he brewer has opened up, i.e., after head 53 has been lowered following the brewing and discharge of a cup of coffee, to bring a fresh reach of tape between the head 53 and the cup 51. This becomes clamped between the head and the cup when the head is raised to close the brewer, and filters out any fines that may pass through the screen 57. Then, when the brewer opens up, the tape is fed forward to carry the used reach of tape out from between the head and the cup and to bring a fresh reach of tape into position between the head and the cup for the next brew cycle.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A vendor comprising a brew vessel for receiving a measured quantity of hot water for brewing a corresponding quantity of coffee, a hot water tank, a hot water line interconnecting the tank and vessel, a brew cup for holding a charge of ground coffee, a filter at the bottom of the cup, means mounting the cup for engagement with and disengagement from the bottom of the vessel, means for delivering a charge of ground coffee to the cup when the cup is disengaged from the vessel, means for delivering said measured quantity of hot water from the tank through said hot water line to the vessel when the cup, with the charge of ground coffee therein, is engaged with the bottom of the vessel, the cup then being in communication with the vessel for brewing coffee in the vessel and cup, a delivery line for delivering filtered brewed coffee from the cup, and means for delivering compressed air to the vessel after the hot water has been delivered thereto including time delay means for delaying delivery of the compressed air for a time delay interval following completion of delivery of the hot water for forcing brewed coffee out of vessel and cup through said filter and thence through said delivery line.

2. A vendor as set forth in claim 1 wherein said time delay means includes means for varying said time delay interval.

3. A vendor as set forth in claim 2 wherein said time delay means includes means for establishing a normal time delay interval for brewing coffee of normal strength and means selectively operable by a customer for establishing a longer time delay interval for brewing extra strong coffee.

4. A vendor as set forth in claim 3 wherein the means for establishing the normal time delay interval and the means for establishing the longer time delay interval are independently adjustable for varying the normal time delay interval and the longer time delay interval.

5. A vendor as set forth in claim 1 wherein said mounting means caries the cup for upward movement into sealing engagement with the bottom of the vessel and downward movement away from the bottom of the vessel, for lateral movement when lowered to a retracted position at one side of the vessel, and for flip-over from its retracted position to dump spent coffee grounds from the cup, and wherein means is provided for lowering the cup, moving it to retracted position and flipping it over after th brewed coffee has been forced out.

6. A vendor as set forth in claim 5 having means for sensing completion of delivery of the brewed coffee from the vesel and cup for effecting operation of the means for lowering, retracting and flipping over the cup only after completion of delivery of brewed coffee from the vessel and cup.

7. A vendor as set forth in claim 5 wherein the brewed coffee flows from the delivery line through a mixer, and having a cream dispenser and a sugar dispenser for dispensing cream and sugar into said mixer, and means for sensing flow of brewed coffee in said delivery line of said mixer for effecting operation of said dispensers only while brewed coffee is flowing through said mixer.

8. A vendor as set forth in claim 7 also having means responsive to said sensing means for effecting operation of the means for lowering, retracing and flipping over the cup only after completion of delivery of brewed coffee from the vessel and cup.

9. A vendor as set forth in claim 8 wherein said sensing means comprises probe means in said delivery line which senses flow of brewed coffee to said mixer by establishment of an electrical circuit through brewed coffee at the probe means and which senses completion of delivery of the brewed coffee by opening of said circuit as the brewed coffee flows past said probe means.

10. A vendor as set forth in claim 5 wherein said means for lowering, retracting and flipping over the cup returns it to retracted position after flip-over, with a dwell in retracted position after said return, followed by movement of the cup into position beneath the brew vessel, and wherein the means for delivering the charge of ground coffee into the cup is operative during said dwell.

11. A brewer for a coffee vendor comprising a brew vesel having an inlet for hot water and being open at the bottom, a brew cup for holding a charge of ground coffee, an arm carrying the cup at one end, a horizontal pivot for the arm at its other end, means mounting said pivot for lateral movement relative to the vessel between a first position adjacent the vessel and a second position away from the vessel, said cup being swingable with the arm when the pivot is in its first position between a lowered position below the bottom of the vesel and a raised position in sealed engagement with the bottom of the vessel, with the cup facing upward, a bottom head for engagement withe cup when the pivot is in its first position, said head having an outlet, means mounting the head for movement between a lowered position and a raised position for raising and lowering the cup, means for raising and lowering the head to raise and lower the cup, means for moving said pivot, after the cup has been lowered, to its said second position to withdraw the cup from between the head and the vessel, and means for then swinging the arm to invert the cup to dump the spent coffee grounds therefrom.

12. A brewer as set forth in claim 11 wherein said means for moving said pivot is adapted to move said pivot to its said second position, to cause it to dwell in its said second position for a dwell interval, and then to return it to its first position, said means for swinging the arm acting to swing it over to invert the cup, and then swing it back during said dwell interval.

13. A brewer as set forth in claim 12 wherein means for moving the pivot causes the pivot to dwell in its said second position for an interval after the arm has been swung back for charging the cup with ground coffee.

14. A brewer as set forth in claim 13 wherein the means for swinging said arm comprises a lever engageable with said arm comprises a lever engageable with said arm upon movement of said pivot to its second position, and means for actuating said lever to flip over said arm.

15. A brewer as set forth in claim 14 wherein an over-centering spring is connected to said arm for snapping the arm downward after it has been overcentered by said lever.

16. A brewer as set forth in claim 11 wherein the cup has a filter screen at its bottom.

17. A brewer as set forth in claim 16 wherein the vessel has a screen at its bottom of larger mesh than the screen at the bottom of the cup.

18. A brewer as set forth in claim 11 having means for feeding a filter tape between the bottom of the cup and the bottom head.

19. A single-cup fresh coffee vendor comprising a brewer adapted to receive a charge of ground coffee and hot water for brewing a cup of coffee and to be closed for brewing the coffee and opened for discharging spent coffee grounds and receiving a fresh charge of ground coffee, a mixer adapted for flow therethrough of brewed coffee from the brewer, a cream dispenser and a sugar dispenser for dispensing cream, sugar, or both into the mixer, according to a customer's selection, a line for delivery of brewed coffee from the brewer to the mixer, an electrical circuit including probe means in said line adapted to complete the circuit when brewed coffee from the brewer reaches the probe means, the circuit being opened when the brewed coffee has flowed past the probe means, means responsive to completion of said circuit when brewed coffee from the brewer reaches said probe means for initiating operation of one or the other or both of said dispensers, according to a customer's selection, after a time delay sufficient for its brewed coffee to reach the mixer, and means responsive to opening of said circuit when the brewed coffee has flowed past the probe means for opening the brewer.

20. A single-cup fresh brew coffee vendor as set forth in claim 19 having means for delivering a cup of hot water to the brewer, means for pressurizing brewed coffee for delivery from the brewer through said line, and means for operating said pressurizing means after the hot water has been delivered to the brewer including time delay means for delaying operation of said pressurizing means for a time delay interval following completion of delivery of hot water to the brewer.

21. A single-cup fresh brew coffee vendor as set forth in claim 20 wherein said time delay means includes means for establishing a normal time delay interval for brewing coffee of normal strength and means selectively operable by a customer for brewing extra strong coffee.

22. A single-cup fresh brew coffee vendor as set forth in claim 20 wherein said means responsive to opening of said circuit includes time delay means for delaying the opening of the brewer for a time delay interval following the flow of brewed coffee past the probe means.

23. A single-cup fresh brew coffee vendor as set forth in claim 20 having a programmer including a timer motor for timing the delivery of hot water to the brewer, the operation of said pressurizing means, the delivery of cream and sugar, and the opening of the brewer, said motor being initially energized on a selection by a customer, deenergized in response to completion of delivery of hot water to the brewer, re-energized by said time delay means at the conclusion of said time delay interval for actuation of said pressurizing means for delivery of brewed coffee through said line, deenergized if brewed coffee has not reached said probe means for delaying dispensing of cream and sugar, and re-energized or maintained energized if brewed coffee reaches the probe means in time for dispensing of cream and sugar.

24. A single-cup fresh brew vendor as set forth in claim 23 further having time delay means for deenergizing the motor for a time delay interval following the flow of brewed coffee past the probe means to delay opening of the brewer until the brewed coffee is out of said line, and then re-energizing the motor.

25. A single-cup fresh brew coffee vendor as set forth in claim 23 further having a system for vending a cup of tea or decaffeinated coffee comprising a dispenser for instant decaffeinated coffee, means for delivering hot water for brewing the tea or decaffeinated coffee, said programmer including means for controlling said system, and means for operating said motor through an uninterrupted cycle for vending a cup of tea or decaffeinated coffee.

26. A single-cup fresh brew coffee vendor as set forth in claim 25 wherein the brewed tea or decaffeinated coffee is delivered to the mixer for addition of cream and sugar, wherein the vendor has selectors for extra cream and extra sugar, and the programmer has means operable in response to actuation of said selectors for operating the cream and sugar dispensers to dispense extra cream and extra sugar into brewed coffee, and means operable in response to actuation of said selectors for independently operating the cream and sugar dispensers to dispense cream and sugar into brewed tea or decaffeinated coffee.

27. A coffee vendor comprising a brewer adapted to receive a charge of ground coffee and hot water for brewing coffee and to be closed for brewing the coffee and opened for discharging spent coffee ground and receiving a fresh charge of ground coffee, and operable through a brew cycle involving delivery of hot water to the brewer for brewing coffee followed by opening of the brewer and discharge of spent coffee grounds, means for delivering a charge of ground coffee to the brewer when it is opened, and meansf or effecting operation of said delivery means toward the end of each brew cycle and prior to the initiation of the next brew cycle.

28. A coffee vendor as set forth in claim 27 wherein the brewer includes a brew cup for holding the charge of ground coffee, said cup normally occupying a partially open position at the start of a brew cycle and being returned to said partially open position at the end of a brew cycle.

29. A coffee vendor having a brewer, a mixer adapted for flow therethrough of coffee brewed in the brewer, a cream dispenser and a sugar dispenser for dispensing cream, sugar or both into the mixer, according to the customer's selection, a line for delivery of brewed coffee to the mixer, and an electrical circuit for controlling operation of the dispensers including a pair of probes in said line adapted to complete the circuit when brewed coffee in said line bridges the probes, each probe extending downward into said line through a chamber adapted to trap air when brewed coffee flows through said line to prevent the brewed coffee from contacting the upper ends of the chambers, thereby preventing build-up of scale in the line bridging the probes.

30. A coffee vendor having a brewer adapted to receive a charge of ground coffee and hot water for brewing coffee and to be closed for brewing the coffee and opened for discharging spent coffee grounds and receiving a fresh charge of coffee, a line for delivery of brewed coffee from the brewer, and an electrical circuit for controlling the opening of the brewer and delaying opening of the brewer until all the coffee is out of the brewer including a pair of probes in said line, said circuit being opened when coffee from the brewer completes its flow past the probes, each probe extending downward into said line through a chamber adapted to trap air when brewed coffee flows through said line to prevent the brewed coffee from contacting the upper ends of the chambers, thereby preventing build-up of scale in the line bridging the probes.

31. A coffee vendor comprising
a brew vessel for receiving a measured quantity of hot water for brewing a corresponding quantity of coffee,
means for holding a charge of ground coffee at the bottom of said vessel, said means having a filter,
a hot water tank,
means for delivering said measured quantity of hot water from said tank to said vessel,
means for venting said vessel while the hot water is being delivered thereto,
and means for closing said venting means and delivering compressed air to said vessel after the hot water has been delivered thereto for forcing brewed coffee out of said vessel through said filter.

32. A coffee vendor as set forth in claim 31 having time delay means for delaying delivery of compressed air to said vessel for a time delay interval following completion of delivery of the hot water.

33. A coffee vendor as set forth in claim 31 wherein the means for delivering said measured quantity of hot water from said tank to said vessel comprises a line from the tank to the vessel for gravity flow of water from the tank to the vessel, said line having a valve therein, and means for opening said valve for such a time interval as to allow gravity flow of said measured quantity of water to said vessel.

34. A coffee vendor comprising a brewer adapted to receive a charge of ground coffee and hot water for brewing coffee, said brewer comprising means for establishing a chamber for a charge of ground coffee including a lower filter and an upper filter between which the charge is confined, means for delivering to said chamber a charge of ground coffee having a volume less than that of said chamber so that the charge, while confined between said filters, is loose in said chamber, means for relivering hot water to the brewer and holding it in the brewer for a brew interval for brewing coffee from said charge, the particles of ground coffee in said chamber rising in the hot water and becoming soaked with hot water, and then settling in the hot water into a bend on the lower filter, and means operable on termination of the brew interval for forcing brewed coffee down and out of the brewer through said bed and the lower filter.

References Cited

UNITED STATES PATENTS

| | | | |
|---|---|---|---|
| 2,615,384 | 10/1952 | Ranz | 99—282 |
| 3,011,426 | 12/1961 | Mueller | 99—282 X |
| 3,120,440 | 2/1964 | Ross | 99—289 X |
| 3,125,945 | 3/1964 | Hanson | 99—289 |
| 3,221,637 | 12/1965 | Small | 99—289 |
| 3,253,534 | 5/1966 | Ross | 99—289 |

ROBERT W. JENKINS, *Primary Examiner.*